(12) United States Patent
Kanaya et al.

(10) Patent No.: US 10,315,428 B2
(45) Date of Patent: Jun. 11, 2019

(54) PRINTING DEVICE

(71) Applicant: SEIKO EPSON CORPORATION, Tokyo (JP)

(72) Inventors: Munehide Kanaya, Azumino (JP); Eiko Yanagida, Shiojiri (JP); Toshifumi Sakai, Shiojiri (JP); Nobuhisa Nomoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/553,837

(22) PCT Filed: Mar. 29, 2016

(86) PCT No.: PCT/JP2016/060037
§ 371 (c)(1),
(2) Date: Aug. 25, 2017

(87) PCT Pub. No.: WO2016/158913
PCT Pub. Date: Oct. 6, 2016

(65) Prior Publication Data
US 2018/0244054 A1 Aug. 30, 2018

(30) Foreign Application Priority Data

Mar. 30, 2015 (JP) ................. 2015-070364
Mar. 30, 2015 (JP) ................. 2015-070365
Mar. 30, 2015 (JP) ................. 2015-070366

(51) Int. Cl.
*B41J 2/175* (2006.01)
*B41J 2/01* (2006.01)
(Continued)

(52) U.S. Cl.
CPC ............ *B41J 2/17509* (2013.01); *B41J 2/01* (2013.01); *B41J 2/175* (2013.01); *B41J 2/1752* (2013.01);
(Continued)

(58) Field of Classification Search
CPC ... B41J 2/17509; B41J 2/1752; B41J 2/17536
See application file for complete search history.

(56) References Cited

U.S. PATENT DOCUMENTS 6,179,416 B1 * 1/2001 Ikeda .................. B41J 2/17513
347/86
2008/0136864 A1 6/2008 Nakamura et al.
(Continued)

FOREIGN PATENT DOCUMENTS

JP 07-60977 3/1995
JP 09-011497 A 1/1997
(Continued)

OTHER PUBLICATIONS

International Search Report dated Jun. 21, 20106 for PCT/JP2016/060037.
(Continued)

*Primary Examiner* — Jason S Uhlenhake
(74) *Attorney, Agent, or Firm* — Workman Nydegger

(57) ABSTRACT

A printing device includes a printing unit that performs printing on a medium using liquid. A liquid container includes a liquid containing chamber, which is capable of containing the liquid supplied to the printing unit, and a liquid inlet, which allows the liquid containing chamber to be filled with the liquid. A shell accommodates the printing unit and a portion of the liquid container. The liquid container includes a projecting portion that projects out of the shell. A protection member covers the projecting portion. The protection member projects out of the shell in a direction that is the same as a direction in which the liquid container projects out of the shell.

16 Claims, 26 Drawing Sheets

(51) Int. Cl.
*B41J 29/13* (2006.01)
*H04N 1/00* (2006.01)
(52) U.S. Cl.
CPC .......... *B41J 2/17536* (2013.01); *B41J 29/13* (2013.01); *H04N 1/00551* (2013.01)

(56) References Cited

U.S. PATENT DOCUMENTS

| | | |
|---|---|---|
| 2009/0021564 A1 | 1/2009 | Seino et al. |
| 2013/0169720 A1 | 7/2013 | Nakamura et al. |
| 2014/0043403 A1 | 2/2014 | Nakano et al. |
| 2014/0043408 A1 | 2/2014 | Kudo et al. |
| 2014/0104349 A1* | 4/2014 | Kimura ................ B41J 2/17509 347/85 |
| 2014/0198165 A1* | 7/2014 | Rao ........................... B41J 3/60 347/104 |
| 2014/0375731 A1 | 12/2014 | Miyazaki et al. |
| 2015/0124028 A1 | 5/2015 | Kimura et al. |
| 2015/0174907 A1 | 6/2015 | Kimura et al. |
| 2015/0283816 A1 | 10/2015 | Kimura et al. |
| 2015/0306885 A1 | 10/2015 | Igarashi |
| 2015/0352853 A1 | 12/2015 | Kudo et al. |
| 2016/0009096 A1 | 1/2016 | Suzuki et al. |
| 2016/0009100 A1 | 1/2016 | Kudo et al. |
| 2016/0016409 A1 | 1/2016 | Kimura et al. |
| 2016/0121615 A1 | 5/2016 | Igarashi |
| 2016/0200111 A1 | 7/2016 | Kimura et al. |
| 2016/0221348 A1 | 8/2016 | Nakamura et al. |
| 2016/0375690 A1 | 12/2016 | Igarashi |
| 2017/0008298 A1 | 1/2017 | Suzuki et al. |

FOREIGN PATENT DOCUMENTS

| | | |
|---|---|---|
| JP | 2001-10073 | 1/2001 |
| JP | 2003-334967 | 11/2003 |
| JP | 2004-249518 A | 9/2004 |
| JP | 2005-231246 A | 9/2005 |
| JP | 2006-175749 | 7/2006 |
| JP | 2009-045916 A | 3/2009 |
| JP | 2013-59892 | 4/2013 |
| JP | 2013-139140 | 7/2013 |
| JP | 2013-151098 | 8/2013 |
| JP | 2014-34204 | 2/2014 |
| JP | 2014-54824 | 3/2014 |
| JP | 2014-58098 | 4/2014 |
| JP | 2014-079908 A | 5/2014 |
| JP | 2014-79909 | 5/2014 |
| JP | 2014-94536 | 5/2014 |
| JP | 2015-20347 | 2/2015 |
| JP | 2015-208865 | 11/2015 |
| JP | 2016-00505 A | 1/2016 |
| JP | 2016-87849 | 5/2016 |
| WO | 2013-085023 | 6/2013 |
| WO | 2014112344 A | 7/2014 |

OTHER PUBLICATIONS

Supplementary European Search Report issued in Application No. 16772794 dated Oct. 10, 2018.

* cited by examiner

PRINTING DEVICE

TECHNICAL FIELD

The present invention relates to a printing device that performs printing using liquid such as ink supplied from a liquid container that can be filled with the liquid.

BACKGROUND ART

One example of a known printing device is an inkjet printer that ejects a liquid such as ink from a printing unit onto a medium to print an image or the like. In the prior art, one example of such a printer includes a liquid container such as a tank that can be filled with a liquid used for printing such as ink. The printer performs printing using the liquid that is supplied from the liquid container through a liquid supply tube (for example, refer to patent document 1).

PRIOR ART DOCUMENT

Patent Document

Patent Document 1: JP-A-2014-54824

Problems that are to be Solved by the Invention

In the printer described above, the liquid container is filled with liquid by the user. Thus, it is desirable that the convenience of such a printer be further improved.

It is an object of the present invention to provide a printing device that improves convenience.

Means for Solving the Problems

The means for achieving the object described above and the effects of such means will now be described.

A printing device that achieves the above object includes a printing unit that performs printing on a medium using liquid. A liquid container includes a liquid containing chamber, which is capable of containing the liquid supplied to the printing unit, and a liquid inlet, which allows the liquid containing chamber to be filled with the liquid. A shell accommodates the printing unit and a portion of the liquid container. The liquid container includes a projecting portion that projects out of the shell. A protection member covers the projecting portion. The protection member projects out of the shell in a direction that is the same as a direction in which the liquid container projects out of the shell.

With this structure, the liquid container is partially accommodated in the shell. Thus, compared with when the liquid container is entirely arranged outside the shell, the area occupied by the entire device can be decreased. Thus, the printing device can be used when not much area is available. This improves the convenience. Further, the portion of the liquid container projecting out of the shell is covered by the protection member that projects out of the shell in the same direction. The protection member reduces displacement of the liquid container that would occur when an object strikes the projecting portion from the outside.

Preferably, in the printing device, the liquid inlet is included in the projecting portion.

With this structure, since the liquid inlet is included in the projecting portion, the user can easily add liquid.

Preferably, in the printing device, the protection member includes an opening that exposes the liquid inlet at a position corresponding to the liquid inlet.

With this structure, while the protection member protects the portion of the liquid container projecting out of the shell, ink can be added from the liquid inlet that is exposed to the outside through the opening of the protection member when the amount of liquid in the liquid container becomes low to continuously perform printing.

Preferably, in the printing device, the liquid container is one of a plurality of liquid containers, and the liquid containers are formed integrally.

Preferably, in the printing device, the liquid container is shaped to have a rectangular parallelepiped form as a whole. Further, the liquid container is attached to the shell in one of a front surface attachment arrangement in which the liquid container projects out of a front surface of the shell and a longitudinal direction of the liquid container conforms to a rearward direction of the shell, a side surface attachment arrangement in which the liquid container projects out of a side surface of the shell and the longitudinal direction conforms to a lateral direction that is orthogonal to the rearward direction, and a diagonal attachment arrangement in which the liquid container projects out of a corner of the shell where the front surface and the side surface intersect and the longitudinal direction is diagonal to any one of the rearward direction and the lateral direction.

With this structure, in accordance with environmental conditions such as the shape of the location where the printing device is set, the attachment arrangement of the liquid container can be selected from the front surface attachment arrangement, the side surface attachment arrangement, and the diagonal attachment arrangement. This improves the convenience.

Preferably, the printing device further includes an ejection portion on which the medium ejected from the printing unit is placed. The liquid container is shaped to have a rectangular parallelepiped form as a whole. The liquid container is attached to the shell in a front surface attachment arrangement in which the liquid container projects out of a front surface of the shell and a longitudinal direction of the liquid container conforms to a rearward direction of the shell. Further, a frontward projection amount of the liquid container from the shell is less than or equal to a frontward projection amount of the ejection portion from the shell.

With this structure, situations can be limited in which the projection of the liquid container from the shell is excessive at the front surface. This reduces displacement of the liquid container that would occur when an object strikes the liquid container from the outside because the projection of the liquid container is excessive.

Another printing device that achieves the above object includes a printing unit that performs printing on a medium using liquid. A liquid supply unit includes a liquid container capable of containing the liquid supplied to the printing unit. A shell accommodates the printing unit and at least a portion of the liquid supply unit. The liquid supply unit includes a liquid inlet that allows the liquid containing chamber to be filled with the liquid. The shell includes a holding portion that is capable of holding the liquid supply unit in a positioned state.

With this structure, the liquid supply unit, which includes the liquid container, is held in a positioned state by the holding portion of the shell, and at least a portion of the liquid supply unit is accommodated in the shell. Thus, compared with when the entire liquid supply unit is located outside the shell, the area occupied by the entire device can be reduced. This allows the liquid container to be filled with liquid in a stably held state. Further, the printing device can be used when not much area is available. This improves the convenience.

Preferably, in the printing device, the holding portion is capable of holding the liquid supply unit in a fixed state. In this case, "capable of holding the liquid supply unit in a fixed state" refers to a state in which, for example, the liquid supply unit is fixed in a non-movable state by screws or an adhesive and removal of the screws or the adhesive would be burdensome. That is, the user would not remove the liquid supply unit during normal usage.

With this structure, the liquid supply unit is held in a positioned and fixed state. Thus, liquid can be added in a stable state.

Preferably, in the printing device, the liquid container includes an aligning mechanism that aligns the liquid container and the holding portion when the liquid container is attached to the holding portion.

With this structure, the aligning mechanism functions to couple and align the liquid supply unit, which includes the liquid container that has the liquid inlet, with the holding portion of the shell. This limits situations in which the liquid container is held in a state displaced relative to the holding portion.

Preferably, in the printing device, the aligning mechanism includes a guide and a sliding portion. The guide is included in one of the liquid supply unit and the holding portion. The guide extends in a direction in which the liquid supply unit is coupled to the holding portion. The sliding portion is included in the other one of the liquid supply unit and the holding portion. The sliding portion slides relative to the guide when the liquid supply unit is coupled to the holding portion.

With this structure, the guide, which is included in one of the liquid supply unit and the holding portion, contacts the sliding portion, which is included in the other one of the liquid supply unit and the holding portion. In this state, the sliding portion is moved to slide along the guide. This allows the liquid container to be easily coupled to the holding portion.

Preferably, in the printing device, the liquid supply unit includes liquid containers that are laid out next to each other in one direction. Further, the aligning mechanism is located at one side and another side of the liquid supply unit with respect to a direction in which the liquid containers are laid out.

With this structure, the liquid supply unit is positioned relative to the holding portion at least at the two points that are one side and the other side of the liquid supply unit with respect to the layout direction of the liquid containers.

Preferably, in the printing device, a lower portion of the shell includes a medium setting portion on which the medium is set. Further, the liquid inlet is located frontward from the medium setting portion.

Preferably, in the printing device, a lower portion of the shell includes a medium setting portion on which the medium is set. Further, a front surface of the liquid container is located frontward from the medium setting portion.

Preferably, in the printing device, an upper portion of the shell includes a reading device configured to read a document. Further, the liquid inlet is located frontward from a front surface of the reading device.

Preferably, in the printing device, an upper portion of the shell includes a reading device configured to read a document. A front surface of the liquid container is located frontward from a front surface of the reading device.

Preferably, the printing device includes a liquid supply tube and a connection adapter that connects the liquid container and the liquid supply tube. A flow passage of the liquid is formed inside the connection adapter.

Preferably, the printing device is provided with a liquid supply unit that includes the plurality of liquid containers. The liquid supply unit includes the connection adapter, and the flow passage of the connection adapter is one of a plurality of flow passages respectively corresponding to the plurality of liquid containers.

Preferably, the printing device includes a cover that covers an opening of the protection member.

Preferably, the printing device further includes a liquid absorbent arranged in a lower portion of the cover. The liquid absorbent is capable of absorbing and holding the liquid.

With this structure, even if liquid is spilt around the liquid inlet when filling the liquid container with liquid through the liquid inlet, the liquid absorbent absorbs and holds such spilt liquid.

EMBODIMENTS OF THE INVENTION

First Embodiment

A first embodiment of an all-in-one machine including a printing device will now be described with reference to the drawings. The printing device in the present embodiment is configured by an inkjet printer that ejects ink, which is one example of a liquid, onto paper, which is one example of a medium, to perform printing. The printer is a so-called serial printer that performs printing by moving a liquid ejection head, which functions as a printing unit, in a main scanning direction, which intersects a paper transfer direction. In the description hereafter, the paper transfer direction will be referred to as "the front-rear direction." The main scanning direction in which the printing unit moves will be referred to as "the lateral direction." The vertical direction that conforms to the gravitational direction will be referred to as "the up-down direction."

Figure 1:
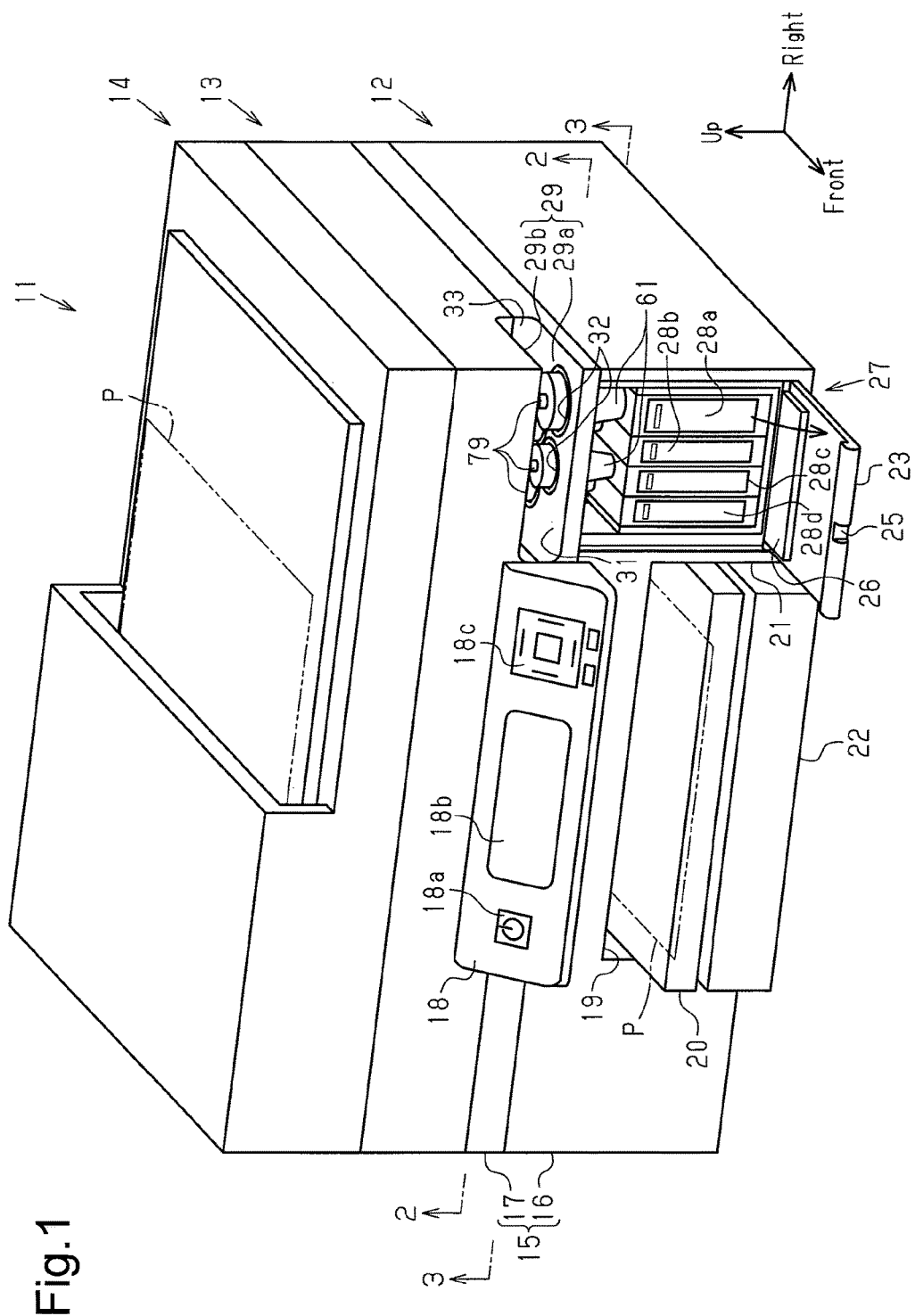
FIG. 1 is a perspective view showing an all-in-one machine including a printing device of a first embodiment.

As shown in FIG. 1, an all-in-one machine 11 includes a printing device 12 that has a printing function, an image reading device 13 that has an image reading function, and an automatic paper feeding device 14 that functions to feed paper to the image reading device 13. The image reading device 13 is located above the printing device 12, and the automatic paper feeding device 14 is located above the image reading device 13. The printing device 12 includes a shell 15 having the form of a rectangular parallelepiped, and the shell 15 includes a lower shell 16 having the form of a rectangular parallelepiped, and an upper shell 17 having the form of a rectangular parallelepiped. The upper shell 17 has a lower height in the vertical direction than the lower shell 16. The lower shell 16 and the upper shell 17 are rectangular parallelepipeds having substantially conforming shapes in a plan view taken from above. The upper shell 17 is coupled onto the lower shell 16 to form the shell 15 that serves as a device body of the printing device 12.

The printing device 12 includes an operation panel 18, which is located on the upper front surface of the upper shell 17 at a generally middle portion in the lateral direction. The operation panel 18 is operated to perform various actions with the all-in-one machine 11. The operation panel 18 includes, for example, a power button 18a, a touch panel type LCD screen 18b, an operation button 18c, and the like. The operation panel 18 has a rectangular shape elongated sideward as viewed from the front. The upper end of the operation panel 18 is located upward from the upper surface of the upper shell 17 that extends from the operation panel 18 toward the rear of the printing device 12. Further, the upper end of the operation panel 18 overlaps part of the front surface of the image reading device 13.

The printing device 12 includes a rectangular paper ejection port 19 located in the front side of the lower shell 16 below the operation panel 18. Paper P that has undergone printing in the shell 15 of the printing device 12 is ejected out of the paper ejection port 19 toward the front. A paper ejection tray 20 (ejection portion), which has the form of a rectangular plate, extends below the paper ejection port 19 and projects toward the front in the paper ejection direction to support the paper P ejected from the paper ejection port 19. The front surface of the lower shell 16 includes a cassette socket 21, which has the form of a rectangular opening, below the paper ejection tray 20. A paper feed cassette 22 (medium setting portion), which holds a stack of paper P, is arranged in the cassette socket 21. The paper feed cassette 22 is freely inserted into and removed from the cassette socket 21 in the front-rear direction. The paper feed cassette 22 is sized so that when inserting into the cassette socket 21, the front end of the paper feed cassette 22 is located at substantially the same position in the front-rear direction as the front end of the paper ejection tray 20.

As shown in FIG. 1, a lid 23, which has the form of a rectangular plate, is located toward one lateral end (right end in FIG. 1) from the cassette socket 21 in the front surface of the lower shell 16 of the printing device 12. The lid 23 freely opens and closes in the front-rear direction as shown by the solid line arrow in FIG. 1 about a rotation shaft 24 (refer to FIG. 5), which is located at the lower end of the lid 23 and extends in the lateral direction. A portion in the edge of the lid 23 located at the opposite side of the rotation shaft 24 is slotted to define a finger hold 25. A user of the printing device 12 places his or her finger on the finger hold 25 when opening or closing the lid 23. An ink absorbent 26 is attached to the rear surface of the lid 23 proximate to the rotation shaft 24. The ink absorbent 26 is one example of a liquid absorbent and formed from a foamed material or the like, such as polyurethane, that is capable of absorbing and holding ink. The portion of the lid 23 where the rear surface does not include the ink absorbent 26 is formed by a transparent member so that the inside is visible when the lid 23 is closed. The lid 23 does not have to use the transparent member. The ink absorbent 26 may be arranged over the entire rear surface of the lid 23 excluding the finger hold 25. Further, an ink absorbent does not have to be arranged on the rear surface of the lid 23.

A liquid supply unit 27 is accommodated in the shell 15 of the printing device 12 at the rear side of the lid 23, that is, near the front surface and one end (in this case, right end) of the printing device 12. The liquid supply unit 27 is sized so that the dimensions in the vertical direction and the lateral direction substantially conform to the dimensions of the lid 23 in the vertical direction and the lateral direction. The liquid supply unit 27 is a structure including a plurality of (four in the present embodiment) liquid containers 28 (28a to 28d) that can be handled integrally. As will be described later, ink can be added to the liquid containers 28a to 28d.

Figure 2:
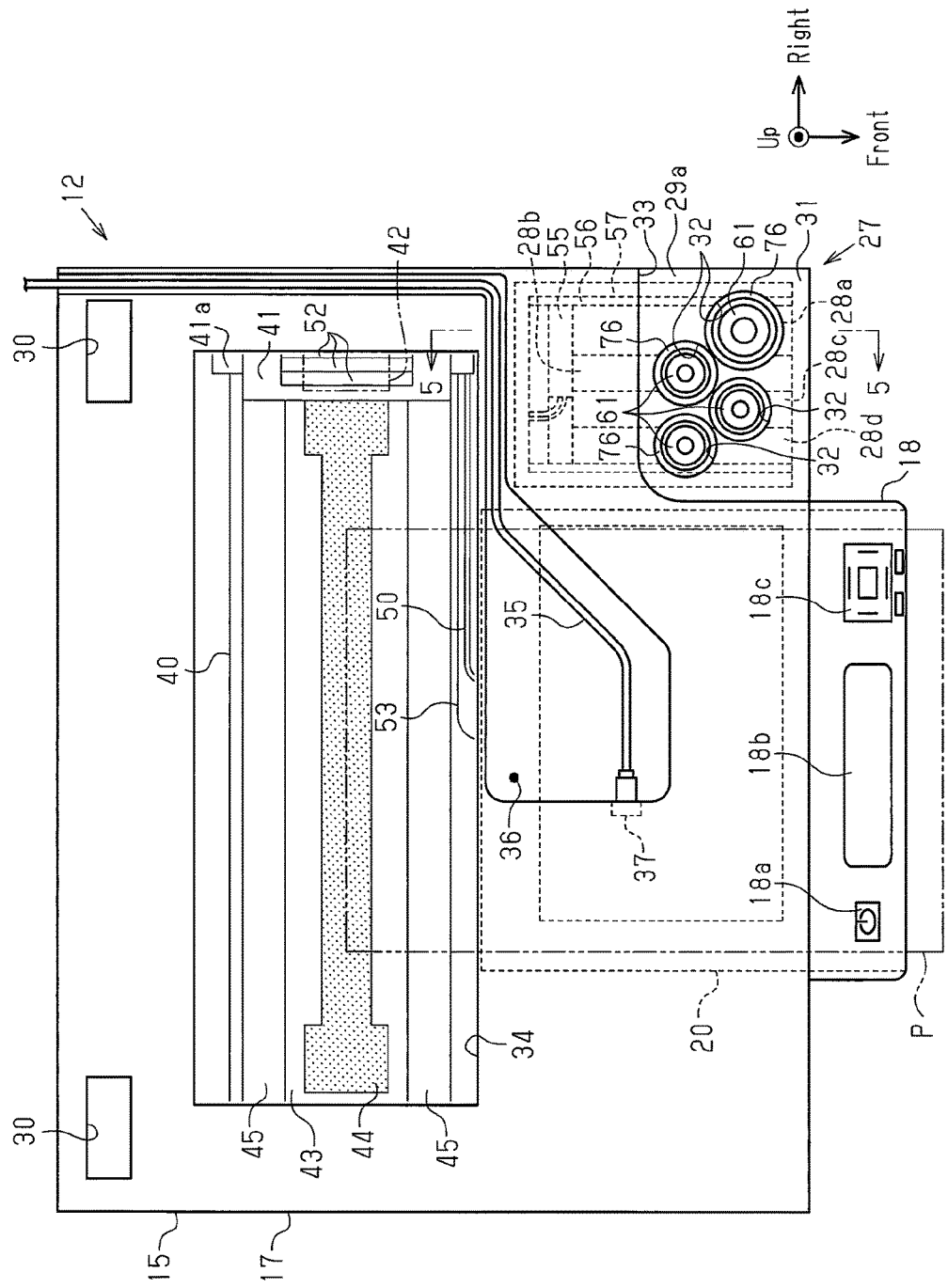
FIG. 2 is a plan view of the printing device in the all-in-one machine of FIG. 1.

As shown in FIGS. 1 and 2, the upper surface of the upper shell 17 of the printing device 12 includes a recess 29a, and the lower surface of the image reading device 13 includes a recess 29b. The recesses 29a and 29b are substantially rectangular and identical to each other in a plan view and located near the front right end of the upper shell 17 and the image reading device 13. The upper surface of the upper shell 17 of the printing device 12 includes the recess 29a that is recessed downward from the upper surface. The lower surface of the image reading device 13 includes the recess 29b that is recessed upward from the lower surface. The recesses 29a and 29b define a hand insertion portion 29 at the vertical boundary of the joining surfaces of the printing device 12 and the image reading device 13. The hand insertion portion 29 allows for the insertion of the hand of a person from the front side or the right side. The hand insertion portion 29 may be formed by only one of the recesses 29a and 29b, and the other one of the recesses 29a and 29b need not be formed.

More specifically, referring to FIG. 1, the image reading device 13 arranged on the printing device 12 can be opened and closed about hinge rods (not shown), which is arranged at the rear side of the image reading device 13, between a close position, where the lower surface of the image reading device 13 faces the upper surface of the upper shell 17, and an open position, where the image reading device 13 opens the upper surface of the upper shell 17. Thus, the rear portion in the upper surface of the shell 15 (more specifically, upper shell 17) of the printing device 12 near the left and right ends include left and right hinge insertion holes 30, which receive the hinge rods (not shown) of the image reading device 13. When moving the image reading device 13 from the close position to the open position, the user inserts his or her hand into the hand insertion portion 29 to open the image reading device 13.

As shown in FIGS. 1 and 2, in the upper surface of the upper shell 17 of the printing device 12, the plane that forms the bottom surface of the recess 29a and extends in the horizontal direction defines a horizontal surface 31 that is spaced apart in the vertical direction from the lower surface of the image reading device 13. The horizontal surface 31 includes a plurality of (four in the present embodiment) open portions 32 that are formed by holes. Laterally succeeding open portions 32 in the lateral direction are not laid out straight. The succeeding open portions 32 in the lateral direction are alternately shifted and offset from one another in the front and rear directions. In the present embodiment, the one of the four open portions 32 located at the rightmost position in the lateral direction is formed by a larger hole than the other three open portions 32. Further, a surface that extends in the vertical direction and defines the formation region of the recess 29a in the upper surface of the upper shell 17 of the printing device 12 forms a vertical surface 33 that extends vertically upward from the horizontal surface 31.

As shown in FIG. 2, the substantially central portion in the upper surface of the upper shell 17 of the printing device 12 includes a rectangular hole 34 of which long sides extend in the lateral direction, or the main scanning direction, and short sides extend in the front-rear direction. The upper surface of the upper shell 17 includes a wiring region 36 that is separate from the rectangular hole 34 and the open portions 32 in the horizontal surface 31. In the wiring region 36, a cable 35 is laid out extending from an external device (not shown) such as a personal computer (PC). The wiring region 36 guides the cable 35 straight for a certain distance from the rear right end of the upper shell 17 along the right surface of the upper shell 17 and then guides and bends the cable 35 at a substantially right angle toward the central portion of the upper shell 17. The wiring region 36 is defined by a groove that expands in the substantially central portion of the upper shell 17. An electric connector 37, which is arranged in the shell 15, is exposed to the outside in the groove. The distal end of the cable 35 laid out in the wiring region 36 is electrically connected to the electric connector 37, which is exposed to the outside in the expanded groove portion of the wiring region 36.

Figure 3:
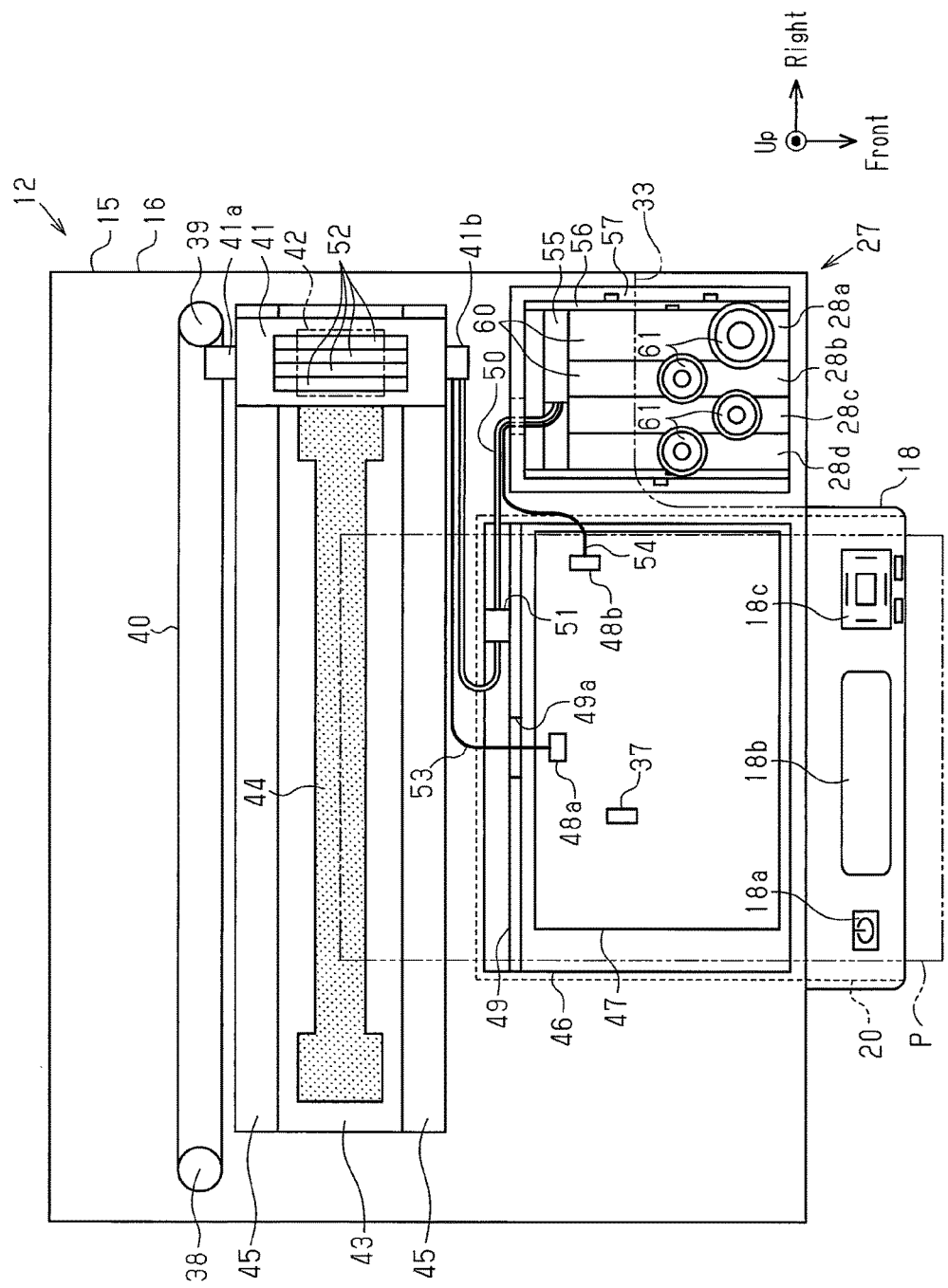
FIG. 3 is a plan view showing the internal structure of the printing device of FIG. 1.

As shown in FIG. 3, in the shell 15 (specifically, lower shell 16) of the printing device 12, a driven pulley 38 is arranged near the rear surface and the left end, and a drive pulley 39 is arranged near the rear surface and the right end. The drive pulley 39 can be rotated by a motor (not shown). An endless timing belt 40 runs between the two pulleys 38 and 39. A portion of the timing belt 40 is coupled to a coupling portion 41a, which is located at the rear side of a carriage 41. A liquid ejection head 42, which is one example of a printing unit, is arranged on the lower surface of the carriage 41 to eject multiple colors (in the present embodiment, four colors) of ink onto the paper P and perform printing.

A support base 43 is arranged in the lower shell 16 of the printing device 12 in front of the timing belt 40. The support base 43 has the form of a rectangular parallelepiped and is elongated in the lateral direction that is orthogonal to the front-rear direction, which conforms to the transfer direction of the paper P. When the paper P is transferred in the transfer direction during printing, the support base 43 supports the lower surface of the paper P. A porous ink absorbent 44 is exposed to the outside over a rectangular region elongated in the lateral direction from the surface of the support base 43 that faces the liquid ejection head 42. Two rails 45, which extend in the lateral direction, are arranged at the front and rear sides of the support base 43 to support the carriage 41 in a movable manner. Accordingly, when the motor is driven to rotate the drive pulley 39, drive force transmitted by the timing belt 40 to the coupling portion 41a moves the carriage 41 back and forth in the lateral direction along the front and rear rails 45.

A support frame 46, which is rectangular in a plan view, is arranged in the lower shell 16 of the printing device 12 at the front side of the front rail 45. A circuit board 47, which functions as a controller including a CPU or the like, is supported by the support frame 46. The electric connector 37, which is connected to the distal end of the cable 35, and a plurality of (only two shown in example of the present embodiment) connectors 48a and 48b are fixed to the circuit board 47. A vertical guide wall 49, which extends elongated in the lateral direction, is formed on a portion of the support frame 46 near the rear edge extending along the rear long side of the circuit board 47.

A slotted recess 49a is formed in the guide wall 49 at a substantially central portion in the lateral direction. A fastening member 51 is arranged on the rear surface of the guide wall 49 toward the right end from the slotted recess 49a at the side facing the carriage 41 to fasten intermediate portions of flexible liquid supply tubes 50, each having one end connected to the liquid supply unit 27. The portion of each liquid supply tube 50 located toward the other end from the fastening member 51 is bent back along the rear surface of the guide wall 49 and extended via a connection portion 41b, which is arranged on the front portion of the carriage 41 to connect the other end to a corresponding one of sub tanks 52 mounted on the carriage 41.

Each sub tank 52 temporarily holds ink supplied through the liquid supply tube 50 and supplies the liquid ejection head 42 with the ink. Instead of mounting the sub tanks 52 on the carriage 41, the liquid supply tubes 50 may be connected by an adapter (not shown) to the liquid ejection head 42. The number of the liquid supply tubes 50 (four in the present embodiment) is equal to the number of the liquid containers 28a to 28d (four in the present embodiment) of the liquid supply unit 27. However, FIG. 3 shows only one and does not show the other three to simplify illustration. Four liquid supply tubes may be formed integrally as a quadruple multi-tube structure.

One end of a signal line 53 is connected to the liquid ejection head 42. The signal line 53 extends from the connection portion 41b of the carriage 41 and along the rear surface of the guide wall 49 at the side facing the carriage 41. Then, the signal line 53 passes through the slotted recess 49a and connects to the circuit board 47 via the connector 48a. Further, one end of a signal line 54 is connected to the liquid supply unit 27, and the other end of the signal line 54 is connected to the other connector 48b on the circuit board 47.

The liquid supply unit 27 of the printing device 12 will now be described. The liquid supply unit 27 functions as a liquid supply device that supplies ink to the liquid ejection head 42.

Figure 4:
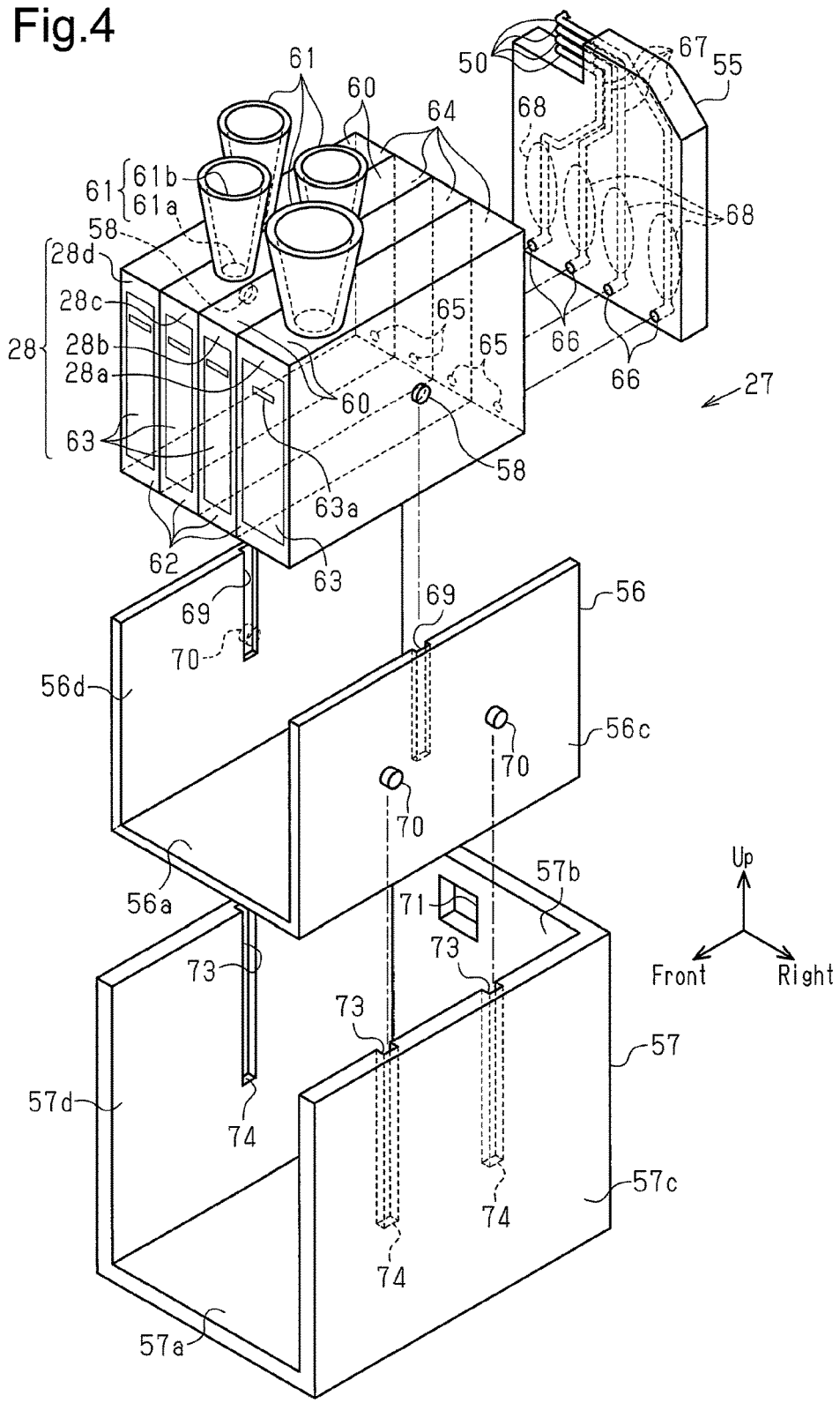
FIG. 4 is an exploded perspective view of a liquid supply device arranged in the printing device of FIG. 1.

As shown in FIGS. 3 and 4, the liquid supply unit 27 includes the liquid containers 28a to 28d, a flow passage formation member 55 (connection adapter), and a setting member 56. Ink flow passages respectively corresponding to the liquid containers 28a to 28d are formed inside the flow passage formation member 55. The setting member 56 sets the liquid containers 28a to 28d together with the flow passage formation member 55, which extends in the thickness-wise direction of the liquid containers 28a to 28d. In a state in which the liquid containers 28a to 28d are set together with the flow passage formation member 55 by the setting member 56 to allow for integral handling, the liquid supply unit 27 is positioned and fastened to a holding member 57. The holding member 57 is fixed as a holding portion inside the shell 15 near the front surface and right end. The holding member 57 is fastened to the lower shell 16 by a screw-fastening mechanism (not shown). The liquid supply unit 27 is fastened to the holding member 57 by a screw-fastening mechanism (not shown) or an adhesive agent (not shown) and positioned in a non-movable manner.

The liquid containers 28a to 28d include the liquid container 28a that contains black ink, the liquid container 28b that contains cyan ink, the liquid container 28c that contains magenta ink, and the liquid container 28d that contains yellow ink. The four liquid containers 28a to 28d are set in the setting member 56 arranged next to one another in the lateral direction, which is the main scanning direction when the liquid ejection head 42 performs printing on the paper P, so that the liquid containers 28a to 28d are in a front surface attachment arrangement in which the longitudinal direction of the liquid containers 28a to 28d conforms to the front-rear direction that extends from the front surface of the shell 15 toward the rear. When the liquid container 28a, which contains black ink and has a larger volume than the other three liquid containers 28b to 28d, is attached inside the shell 15 of the printing device 12, the liquid container 28a is set to be located at the rightmost position in the lateral direction as shown in FIG. 3. The liquid containers may all have the same size.

As shown in FIG. 4, the substantially central portion in the outer side surfaces of two of the four liquid containers 28 (28a to 28d) that are located at the two outer ends in the layout direction (in this case, the liquid container 28a located at the right end and the liquid container 28d located at the left end) each include a cylindrical projection 58 that projects outward. More specifically, the projection 58 of the liquid container 28a for black ink extends rightward from the substantially central part of the right surface, and the projection 58 of the liquid container 28d for yellow ink extends leftward from the substantially central part of the left surface.

The liquid containers 28a to 28d are ink tanks having the form of substantially rectangular parallelepipeds. In a state laid out in the shell 15 by the setting member 56 or the like, the lateral direction of the liquid containers 28a to 28d that conforms to the layout direction is the thickness-wise direction of the liquid containers 28a to 28d, the height-wise direction of the liquid containers 28a to 28d that conforms to the vertical direction is a short side extending direction of the liquid containers 28a to 28d, and the front-rear direction of the shell 15 that conforms to the transfer direction of the paper P is a longitudinal direction of the liquid containers 28a to 28d. The inside of each of the liquid containers 28a to 28d defines a liquid containing chamber 59 that can contain ink. The liquid containers 28a to 28d each include a rectangular upper wall 60 that extends in the longitudinal direction. The upper wall 60 includes a liquid inlet 61 that allows the liquid containing chamber 59 to be filled with ink from the outside.

The liquid inlet 61 is funnel-shaped and includes a first opening 61a, which is one example of an inner end opening that opens in the liquid containing chamber 59, and a second opening 61b, which is an opening located at the opposite side and has a larger diameter than the first opening 61a. The first opening 61a, which is the inner end opening, is located near the front end of the upper wall 60 in each of the liquid containers 28a to 28d. In this regard, the upper wall 60 of each of the liquid containers 28a to 28d corresponds to an opening formation wall in which the inner end opening (first opening 61a) of the liquid inlet 61 is formed in each of the liquid containers 28a to 28d.

The liquid containers 28a to 28d each include a front wall 62 that is exposed to the front side when the lid 23 in the front surface of the shell 15 opens. The front wall 62 includes a visual checking portion 63 that is formed from a transparent resin or the like and allows for visual checking of the liquid level of the ink in the liquid containing chamber 59. Further, the liquid containers 28a to 28d each include a rear wall 64. The bottom portion of the rear wall 64 includes a liquid supply port 65 that supplies ink from the liquid containing chamber 59 to the outside. The flow passage formation member 55 is joined with the rear walls 64 of the liquid containers 28a to 28d and supplied with ink from the liquid supply ports 65.

As shown in FIG. 4, the flow passage formation member 55 is a plate-like member having a predetermined thickness and formed from a resin material. The bottom portion of the flow passage formation member 55 includes a plurality of (four in the present embodiment) liquid intake ports 66 that are connected to the liquid supply ports 65 when joined with the rear walls 64 of the liquid containers 28a to 28d. A plurality of (four in the present embodiment) flow passages 67 extend upward from the liquid intake ports 66 in the flow passage formation member 55. The flow passages 67 extend upward from the liquid intake ports 66 and then extend sideward (in this case, leftward) to be arranged next to one another in the vertical direction. Each flow passage 67 is connected by a liquid outlet (not shown), which is formed in a leftward facing surface of the flow passage formation member 55 near the upper end, to the corresponding liquid supply tube 50. As shown by the broken lines in FIG. 4, each flow passage 67 in the flow passage formation member 55 includes a pump 68 formed by a diaphragm or the like. The pump 68 is driven to supply ink from the liquid containers 28a to 28d to the liquid ejection head 42.

The setting member 56 is a rectangular case in a plan view and open at the upper side, front side, and rear side. The setting member 56 includes a bottom wall 56a, a right wall 56c, and a left wall 56d. The dimension of the setting member 56 between the opposing inner surfaces of the right wall 56c and the left wall 56d is slightly greater than the dimension of the four liquid containers 28a to 28d laid out in the lateral direction between the right surface of the liquid container 28a at the right end and the left surface of the liquid container 28d at the left end. Further, the dimension of the setting member 56 between the opposing inner surfaces of the right wall 56c and the left wall 56d is slightly greater than the width-wise dimension of the flow passage formation member 55 in the lateral direction. The thickness-wise direction of the flow passage formation member 55 conforms to the front-rear direction. The length of the setting member 56 in the front-rear direction (rearward direction) is longer than the sum of the length of the liquid container 28 in the front-rear direction (longitudinal direction) and the thickness of the flow passage formation member 55 in the front-rear direction by a length corresponding to the thickness of the flow passage formation member 55. Thus, as shown in FIGS. 3 and 4, the four liquid containers 28a to 28d, of which the longitudinal direction conforms to the front-rear direction, and the flow passage formation member 55, of which the thickness-wise direction conforms to the front-rear direction, are set in the setting member 56 in a state in which the rear walls 64 of the liquid containers 28a to 28d, which are arranged next to one another, are joined with the flow passage formation member 55.

The opposing inner surfaces of the right wall 56c and the left wall 56d of the setting member 56 each include a guide groove 69. The left and right guide grooves 69 extend vertically from the upper end surfaces of the left and right walls 56c and 56d to substantially middle positions in the vertical direction. The guide grooves 69 have a width that is slightly greater than the diameter of the cylindrical projections 58 formed on the outer side surfaces of the liquid containers 28a and 28d. Thus, when setting the liquid containers 28a to 28d in the setting member 56, the projections 58, which project from the left and right ends of the liquid containers 28a to 28d that are arranged next to one another, are aligned with the guide grooves 69 of the setting member 56. In this state, the projections 58 are moved downward as sliding portions. This positions the liquid containers 28a to 28d in the front-rear, lateral, and vertical direction. In this regard, the projections 58 and the guide grooves 69 function as an aligning mechanism.

Further, the outer surfaces of the right wall 56c and the left wall 56d of the setting member 56 each include cylindrical projections 70 that project outward. More specifically, two cylindrical projections 70 project from the right wall 56c at two positions separated by a certain distance in the front-rear direction at substantially middle locations in the vertical direction, and one projection 70 located between the two projections 70 of the right wall 56c projects from the left wall 56d at a substantially middle location in the vertical direction. As shown in FIGS. 3 and 4, the setting member 56 is held in the holding member 57 in a state in which the liquid containers 28a to 28d and the flow passage formation member 55 are set in the setting member 56.

The holding member 57 is a case that is rectangular in a plan view and has an open upper side and an open front side. Further, the holding member 57 includes a bottom wall 57a, a rear wall 57b, a right wall 57c, and a left wall 57d. The bottom wall 57a, the rear wall 57b, the right wall 57c, and the left wall 57d function as partition walls that partition the inner side of the holding member 57 from the outer side of the holding member 57. A square through hole 71 is formed in an upper left portion of the rear wall 57b. The liquid supply tube 50 and the signal line 54 are inserted through the through hole 71. In this case, a sealing member 72 (refer to FIG. 5), which is formed by an ink absorbent or the like, closes the gap between the wall surface of the through hole 71 and the liquid supply tubes 50. The holding member 57 also functions as an exterior member that covers at least part of the liquid containers 28a to 28d.

The opposing inner surfaces of the right wall 57c and the left wall 57d include vertical grooves 73 that function as guides and extend from the upper end surfaces of the two left and right walls 57c and 57d to substantially middle positions in the vertical direction. The right wall 57c includes two vertical grooves 73 that are separated by a certain distance in the front-rear direction. The left wall 57d includes one vertical groove 73 located between the two vertical grooves 73 of the right wall 57c. The lower ends of the three vertical grooves 73 are located at the same position in the vertical direction and lie along a horizontal plane. The lower end of each vertical groove 73 is configured to function as an engagement portion 74 that engages, from the lower side, another object moved in the corresponding vertical groove 73 from the upper side toward the lower side (in the present embodiment, corresponding projection 70 of setting member 56).

The dimension between the inner surfaces of the right wall 57c and the left wall 57d of the holding member 57 is slightly greater than the dimension between the outer surfaces of the right wall 56c and the left wall 56d of the setting member 56. The length of the holding member 57 in the front-rear direction (rearward direction) is greater than the length of the setting member 56 in the front-rear direction (rearward direction) by an amount corresponding to the thickness of the rear wall 57b of the holding member 57.

Thus, when the projections 70, which serve as sliding portions and project from the left and right walls 56c and 56d of the setting member 56, slide downward in a state aligned with the left and right vertical grooves 73 of the holding member 57, the liquid containers 28a to 28d are positioned relative to the holding member 57, which is fixed in the shell 15, by the setting member 56 in the front-rear, the lateral and vertical directions. In this regard, the projections 70 and the vertical grooves 73 function as aligning mechanisms. In this manner, when the liquid containers 28 are coupled to the holding member 57 and the setting member 56 in the shell 15, the upper walls 60 extend in a direction (horizontal direction in present embodiment) intersecting the vertical direction. When a combination of one projection 70 and one vertical groove 73 forms a single aligning mechanism, there may be four or more aligning mechanisms. Some or all of the aligning mechanisms may perform aligning and positioning through another method such as screw fastening.

Figure 5:
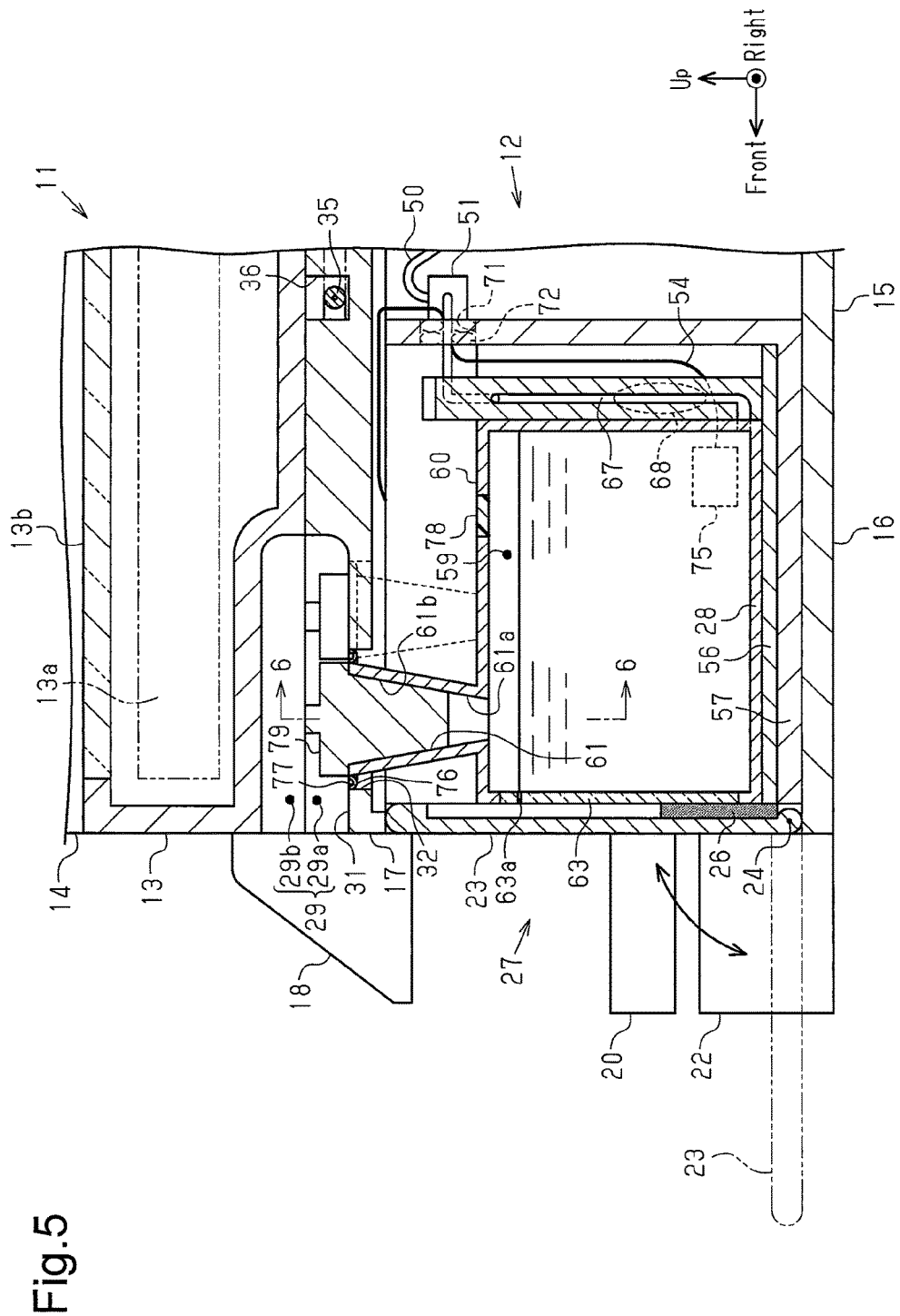
FIG. 5 is a partially, cross-sectional view taken along line 5-5 in FIG. 2.

As shown in FIG. 5, each liquid container 28 includes a remaining amount detector 75 that detects the amount of ink remaining in the liquid containing chamber 59. The remaining amount detector 75 is formed by, for example, a photo-interrupter that includes a light emitting element and a light receiving element and is included in each of the four liquid containers 28a to 28d. Although only one signal line 54 is shown in FIGS. 3 and 5, actually, a set of two signals lines are connected to each of the liquid containers 28a to 28d, with one connected to the light emitting element and the other one connected to the light receiving element. Thus, there are four sets of signals lines connected to the liquid containers 28a to 28d and a ground signal line shared by the liquid containers 28a to 28d. In other words, a total of nine (2×4 sets+1) signal lines are connected to the connector 48b.

In a state in which the liquid containers 28 are accommodated by the setting member 56 and the holding member 57 in the shell 15 near the front surface and the right end, the upper ends of the liquid inlets 61 are located in the open portions 32 of the upper shell 17. An annular seal member 76 is arranged between the upper end of the liquid inlet 61 of each liquid container 28 and the corresponding open portion 32 of the upper shell 17 to seal the gap between the liquid inlet 61 and the open portion 32. More specifically, if ink leaks out of the liquid inlet 61 when adding ink, the seal member 76 prevents the leaking ink from spreading on the upper wall 60 of the liquid container 28 and smearing the liquid container 28. As can be understood from the cross-sectional shape, the seal member 76 includes a recess 77 that is sunken so that leaking ink does not spread out.

The upper wall 60 of each liquid container 28 includes an atmospheric communication portion 78 located rearward from where the liquid inlet 61 is formed. The liquid containing chamber 59 is in communication with the atmosphere through the atmospheric communication portion 78. The atmospheric communication portion 78 is configured by, for example, a fine flow passage structure of meandering elongated grooves referred to as accordion-like grooves or a waterproof moisture permeable material that permits the passage of gas such as air and restricts the passage of liquid.

Figure 6:
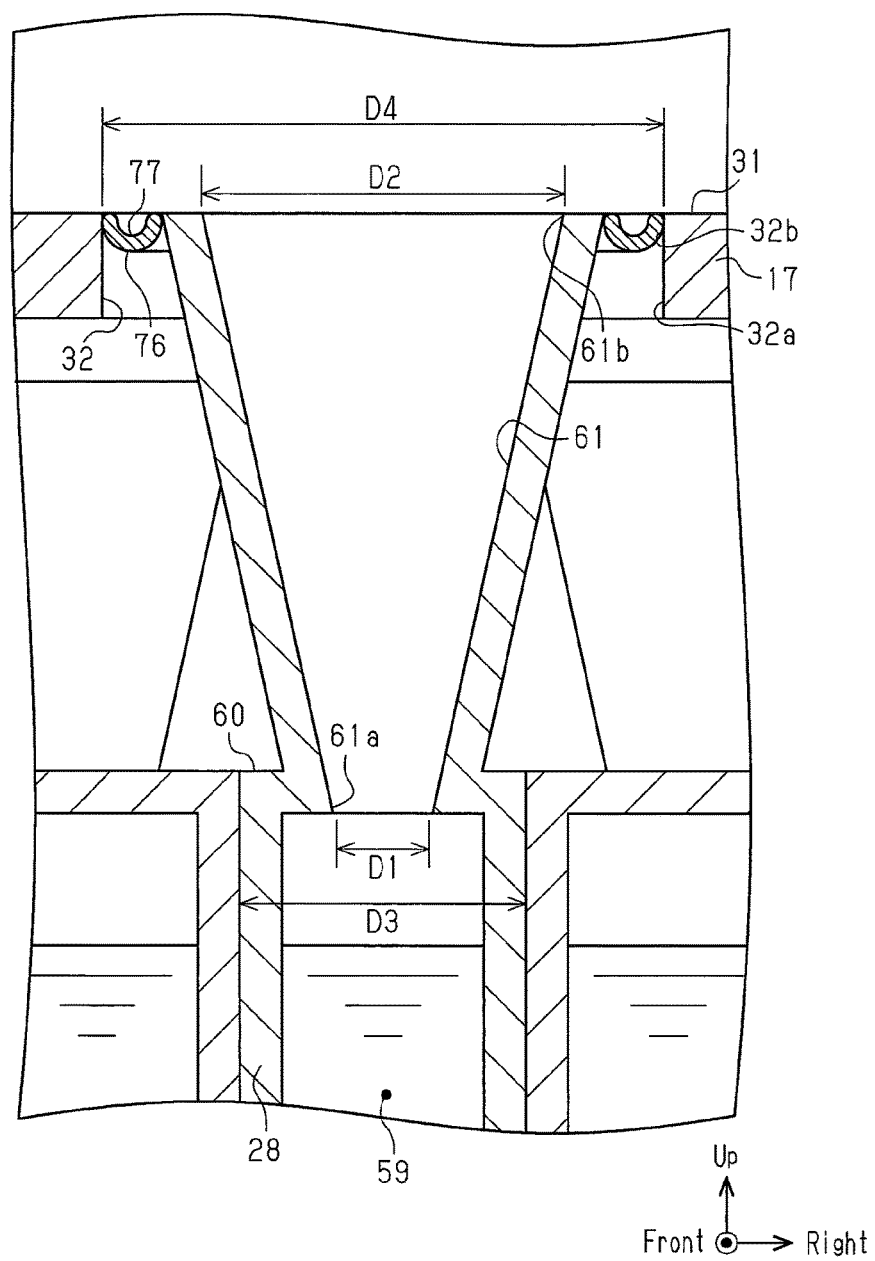
FIG. 6 is a schematic cross-sectional view showing the positional relationship of an opening formed in a shell of the printing device shown in FIG. 1 and a liquid inlet of a liquid container.

For example, as shown in FIGS. 5 and 6, the liquid containers 28 are at least partially (entirely in the present embodiment) covered by the shell 15, which is one example of an exterior member. The horizontal surface 31 of the upper shell 17 of the shell 15 includes the open portions 32 that allows the liquid inlets 61 to be exposed to the outside at positions corresponding to (aligned with) the liquid inlets 61 of the liquid containers 28, which are covered from above by the upper shell 17.

Accordingly, each liquid container 28 is filled with ink by adding ink through a liquid reception portion that includes the liquid inlet 61, which has an inner end opening (first opening 61a) that opens in the liquid containing chamber 59, and the open portion 32, which has an outer end opening at the opposite side. The liquid inlet 61 is normally closed by a plug 79, which is formed from rubber or the like and which is inserted from above into the open portion 32. When the image reading device 13 is located at the close position, the plug 79 is concealed and cannot be seen from the outer side. As shown in FIG. 5, a movable contact image sensor module (CISM) 13a is arranged in the image reading device 13 in a movable manner to read a document (not shown) that is placed on a transparent plate 13b.

FIG. 6 shows and compares the size of the funnel-shaped liquid inlet 61 of the liquid container 28, the open portion 32 in the horizontal surface 31 of the upper shell 17, and the upper wall 60 of the liquid container 28 in one direction (in this case, the main scanning direction of the liquid ejection head 42 and the lateral direction that is the layout direction of the liquid containers 28a to 28d or in the direction of the short sides of the upper wall 60). From the first opening 61a (inner end opening) of the liquid inlet 61 that has the smallest opening width D1, the dimensions gradually increase in the order of the lateral width D3 of the upper wall 60, the opening width D2 of the second opening 61b of the liquid inlet 61 at the side opposite to the first opening 61a, and the opening width D4 of the open portion 32 in the horizontal surface 31 of the upper shell 17. The open portion 32 in the horizontal surface 31 of the upper shell 17 is a cylindrical opening in which the opening width is the same at a third opening 32a, which is located at the side closer to the first opening 61a (inner end opening) of the liquid inlet 61, and a fourth opening 32b (outer end opening), which is located at the side farther from the first opening 61a (inner end opening) of the liquid inlet 61. In FIG. 6, the seal member 76 is arranged in the gap between the open portion 32 and the liquid inlet 61 to prevent the entrance of ink into the upper shell 17.

The operation of the printing device 12 and the liquid supply unit 27 will now be described.

When arranging the liquid supply unit 27, which functions as a liquid supply device, in the shell 15 of the printing device 12, the holding member 57 is first fixed by screws to the lower shell 16 of the shell 15. More specifically, the holding member 57 is fixed to the lower shell 16 near the front surface and the right end. Further, the plurality of (four) liquid containers 28a to 28d and the flow passage formation member 55 are set in the setting member 56 outside the shell 15. The setting member 56, to which the liquid containers 28 and the flow passage formation member 55 have been set, is coupled to the holding member 57.

In this case, the engagement of the projections 70 with the vertical grooves 73 aligns the setting member 56 with the holding member 57. Further, the engagement of the projections 70 with the engagement portions 74, which are the lower ends of the vertical grooves 73, positions the projections 70 in the front-rear, the lateral and vertical directions in a non-movable manner. This arranges and positions the plurality of (four) liquid containers 28 in the shell 15 near the front surface and the right end so that the liquid containers 28 are successively arranged in the lateral direction and so that the longitudinal direction of each liquid container 28 conforms to the front-rear direction. The pump is driven to supply ink from the liquid containers 28 to the liquid ejection head 42 through the liquid supply tubes 50. Ink may be supplied without the pump 68 by using the water head difference of the height of the liquid level of the ink in the liquid containing chamber 59 and the height of the nozzle surface of the liquid ejection head 42 in addition to the nozzle suction force.

Further, in this case, the opening width of the second opening 61b at the upper end of the liquid inlet 61 is larger than the width of the upper wall 60, which serves as an opening formation wall of the liquid container 28, in the lateral direction (one direction), which is the layout direction of the liquid containers 28. Thus, the liquid inlet 61 of adjacent liquid containers 28 may contact each other and form a gap between the adjacent liquid containers 28. However, in the present embodiment, the liquid inlets 61 of adjacent liquid containers 28 are alternately shifted and offset from each other. Thus, such a gap does not form between adjacent liquid containers 28. Further, the side surfaces of the liquid containers 28 are joined with one another. This allows for a compact stacking structure and allows for reduction in the space occupied by the entire device.

Figure 7:
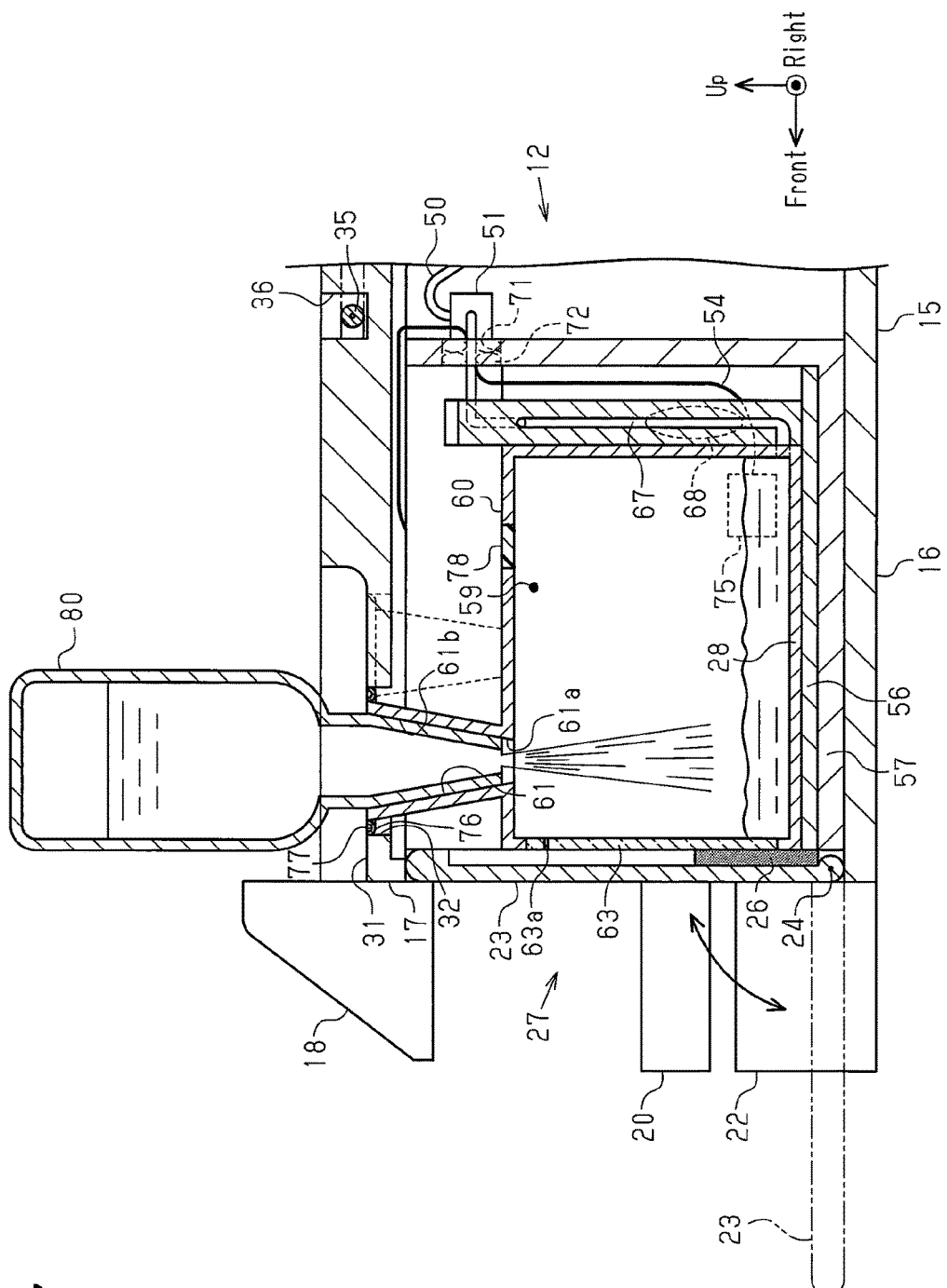
FIG. 7 is a partially, cross-sectional view taken when filling a liquid supply device with liquid in the printing device of FIG. 1.

Referring to FIG. 7, when the detection result of the remaining amount detector 75 indicates that the amount of ink in the corresponding liquid container 28 is in a near-end state, the user opens the image reading device 13, removes the plug 79 from the liquid inlet 61, and then fills the liquid containing chamber 59 with ink through the open portion 32 and the liquid inlet 61. More specifically, the user inserts an ink bottle 80, which is one example of a liquid adding member, into the liquid inlet 61 from the open portion 32 and fills the liquid containing chamber 59 with ink from the ink bottle 80. The amount of ink is checked through the transparent member of the lid 23 and the transparent visual checking portion 63 of each of the liquid containers 28a to 28d. When the ink reaches an upper limit portion 63a indicating that the liquid containing chamber 59 is full, the user stops adding ink, inserts the plug 79 into the liquid inlet 61, and returns the image reading device 13 to the original position.

When adding ink, the open portions 32 and the liquid inlets 61, which are in an offset layout, have a larger opening width than the width of the upper walls 60 of the liquid containers 28. This allows for easy alignment of the ink bottle 80, which serves as the liquid adding member. Further, when adding ink, the rising amount of the liquid level of the added ink in the liquid container 28 is visible through the visual checking portion 63. When the liquid level reaches the upper limit portion 63a in the visual checking portion 63, the user stops adding ink.

Further, when adding ink, if ink is spilt around the open portions 32 of the upper shell 17, which functions as an exterior member and covers the liquid containers 28 from above, the vertical surface 33 of the recess 29a that forms a step stops the spreading of ink to the wiring region 36 of the cable 35, the circuit board 47, and the electric connector 37. In this respect, the vertical surface 33 of the recess 29a in the upper shell 17 functions as a barrier that is capable of stopping the flow of ink (liquid).

In the present embodiment, the printing device 12 and the liquid supply unit 27, which serves as the liquid supply device, has the advantages described below.

(1) The liquid supply unit 27 is accommodated in the shell 15 and held in a state positioned by the holding member 57 of the shell 15. Thus, compared with when the liquid supply unit 27 is entirely arranged outside the shell 15, the area occupied by the entire device can be decreased. This allows liquid to be added to the liquid containers 28 in a stably held state. Further, the printing device 12 can be used when not much area is available. This improves the convenience.

(2) The liquid supply unit 27 is held in a fixed and positioned state. This allows ink to be stably added.

(3) The liquid supply unit 27, which can be handled in an integral manner including the liquid containers 28, is coupled to the holding member 57 of the shell 15 aligned by the projections 70 and the vertical grooves 73 that function as aligning mechanisms. This reduces situations in which the liquid containers 28 are displaced relative to the holding member 57.

(4) In a state in which the projections 70, which serve as sliding portions arranged on the liquid supply unit 27, are in contact with the vertical grooves 73, which serve as guides arranged on the holding member 57, the projections 70 are moved along the vertical grooves 73. This allows the liquid containers 28 to be easily coupled to the holding member 57.

(5) The liquid supply unit 27 is positioned relative to the holding member 57 at least at two points, namely, at one side of the liquid supply unit 27 with respect to the layout direction of the liquid containers 28 and the other side of the liquid supply unit 27 with respect to the layout direction of the liquid containers 28.

(6) The three engagement portions 74 lying along a plane extending along the layout direction of the liquid containers 28 restrict downward movement, which intersects the plain, of the liquid containers 28 set in the setting member 56. Thus, for example, when the horizontal direction is the layout direction, the liquid containers 28 are positioned on the plane that extends in the horizontal direction.

(7) In case ink leaks from the liquid containers 28 held in the holding member 57, the walls 57a to 57d, which function as partition walls of the holding member 57, stop the leaking ink so that the ink does not spread out of the holding member 57. This prevents ink from smearing locations other than the holding member 57 in the shell 15.

(8) Ink is supplied from the liquid containers 28 in the holding member 57 to the liquid ejection head 42, which is located outside the holding member 57, through the liquid supply tubes 50, which are inserted through the through hole 71 in the rear wall 57b. In case ink leaks out of the liquid containers 28, which are located in the holding member 57, the sealing member 72 prevents the leaking ink from flowing out of the holding member 57 through the through hole 71.

(9) The necessity for adding ink to the liquid containers 28 can be checked with the detection result of each remaining amount detector 75.

(10) The ink added from the liquid inlet 61 and held in each liquid container 28 can be supplied toward the liquid ejection head 42 by driving the pump 68.

(11) Each liquid container 28 includes the atmospheric communication portion 78. Thus, ink can be smoothly supplied from the liquid container 28 to the liquid ejection head 42.

(12) The liquid containers 28 are accommodated in the shell 15. This decreases the area occupied by the entire device compared to when the liquid containers 28 are located outside the shell 15. Further, the shell 15 includes the open portions 32 at positions corresponding to the liquid inlets 61 of the liquid containers 28. This allows ink to be added from the open portions 32 to the liquid inlet 61. Thus, ink can be easily added, and the printing device 12 can be used when not much area is available. This improves the convenience.

(13) In the shell 15, the open portions 32 that expose the accommodated liquid inlets 61 of the liquid containers 28 are separated from the wiring region 36 of the cable 35 in the upper surface of the shell 15 (upper shell 17). This avoids situations in which ink spilt from the liquid inlets 61 smears the cable 35.

(14) Even if ink is spilt around the open portions 32 when adding ink to the liquid inlets 61 of the liquid containers 28 through the open portions 32 of the shell 15, the vertical surface 33, which functions as a barrier, stops the flow of the spilt ink so that the ink does not flow to the electric connector 37. This avoids situations in which ink collects on the electric connector 37.

(15) In the liquid reception portion (open portion 32 and liquid inlet 61) of each liquid container 28, the size of the outer end opening (fourth opening 32b), which is located at the opposite side of the inner end opening (first opening 61a) that opens in the liquid containing chamber 59, is greater than or equal to the width of the opening formation wall (upper wall 60) of the liquid container 28, which includes the inner end opening, in one direction (e.g., layout direction of liquid containers 28 or direction of short side of upper wall 60, which is the opening formation wall including the inner end opening of the liquid container 28). This facilitates the alignment of, for example, the liquid adding member (ink bottle 80) with the outer end opening of the liquid reception portion. Accordingly, ink can easily be added, and the convenience is improved.

(16) The surface of the opening formation wall (upper wall 60), which includes the inner end opening (first opening 61a) of the liquid reception portion (open portion 32 and liquid inlet 61), is configured by an upwardly faced horizontal surface. Thus, the liquid reception portion (open portion 32 and liquid inlet 61) is set at a location where ink can easily be added.

(17) The liquid inlet 61 of each of the liquid containers 28, which are arranged next to one another in one direction, is offset from the liquid inlet 61 of the adjacent liquid container 28 in a direction intersecting the one direction. This decreases the occupied area in the layout direction of the liquid containers 28 and limits enlargement of the printing device 12 accordingly.

(18) The user can add ink while checking the liquid level that rises in the liquid containing chamber 59 with respect to the upper limit portion 63a in the visual checking portion 63 so that ink is not spilt out of the liquid inlet 61.

(19) The seal member 76 is arranged around the liquid inlet 61 to seal the gap formed with the open portion 32 in the upper shell 17. This reduces situations in which ink that leaks from the liquid inlet 61 enters and smears the inner side of the holding member 57, which also functions as an exterior member covering the liquid containers 28.

(20) When adding ink, if the ink leaks from the liquid inlet 61 onto the seal member 76, the leaked ink collects in the recess 77 of the seal member 76. This limits unnecessary spreading of the leaked ink.

Second Embodiment

A second embodiment of an all-in-one machine including a printing device will now be described with reference to the drawings. The second embodiment differs from the first embodiment only in how the liquid supply unit 27 is attached to the shell 15 and where the liquid inlets 61 are located. Otherwise the second embodiment is identical to the first embodiment. Thus, same reference numerals are given to those components that are the same as the corresponding components of the first embodiment. Such components will not be described in detail.

Figure 8:
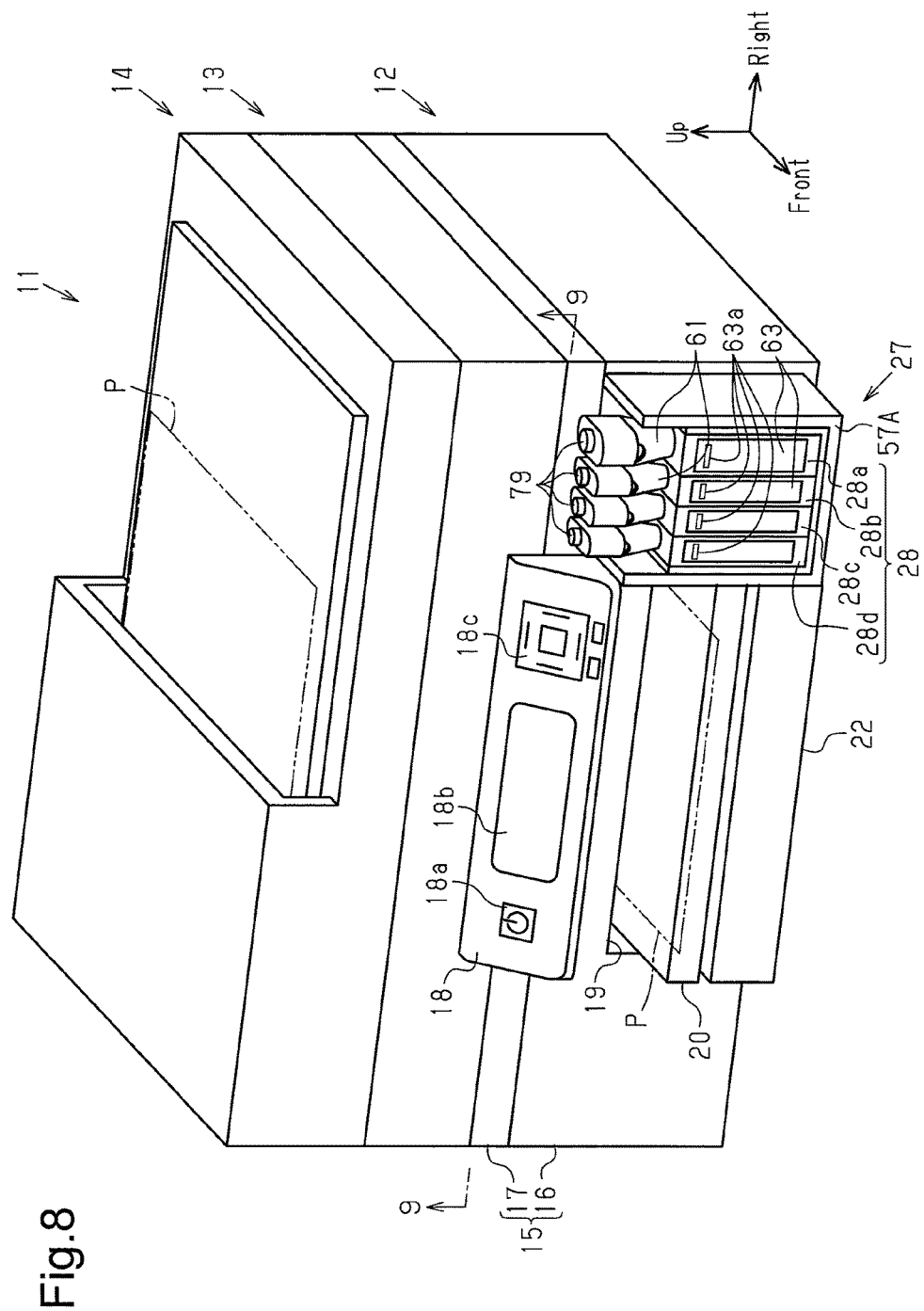
FIG. 8 is a perspective view showing an all-in-one machine including a printing device of a second embodiment.

As shown in FIG. 8, the liquid supply unit 27, which functions as a liquid supply device, is located at a position adjacent to the paper ejection tray 20 and the paper feed cassette 22 at the front side and near the right end of the lower shell 16 of the printing device 12. The liquid supply unit 27 is arranged to partially project frontward from the lower shell 16. More specifically, the rear portions of the liquid containers 28a to 28d and the setting member 56 that form the liquid supply unit 27 are accommodated in the lower shell 16, and the front portions of the liquid containers 28a to 28d and the setting member 56 are exposed to the outside from the lower shell 16. The front end of the liquid supply unit 27 is located at substantially the same position as the front end of the paper ejection tray 20 and the front end of the paper feed cassette 22 in the front-rear direction or closer to the shell 15 than the front end of the paper ejection tray 20 and the front end of the paper feed cassette 22 in the front-rear direction. More specifically, the projection amount of the liquid supply unit 27 in the forward direction is less than or equal to the projection amount of the paper ejection tray 20 and the paper feed cassette 22. In this manner, part of the liquid supply unit 27 in the second embodiment is slightly drawn out of the shell 15 in the forward direction and exposed to the outside. The liquid supply unit 27 that is projected in such a manner results in the holding member 57 being projected in the same manner.

Figure 9:
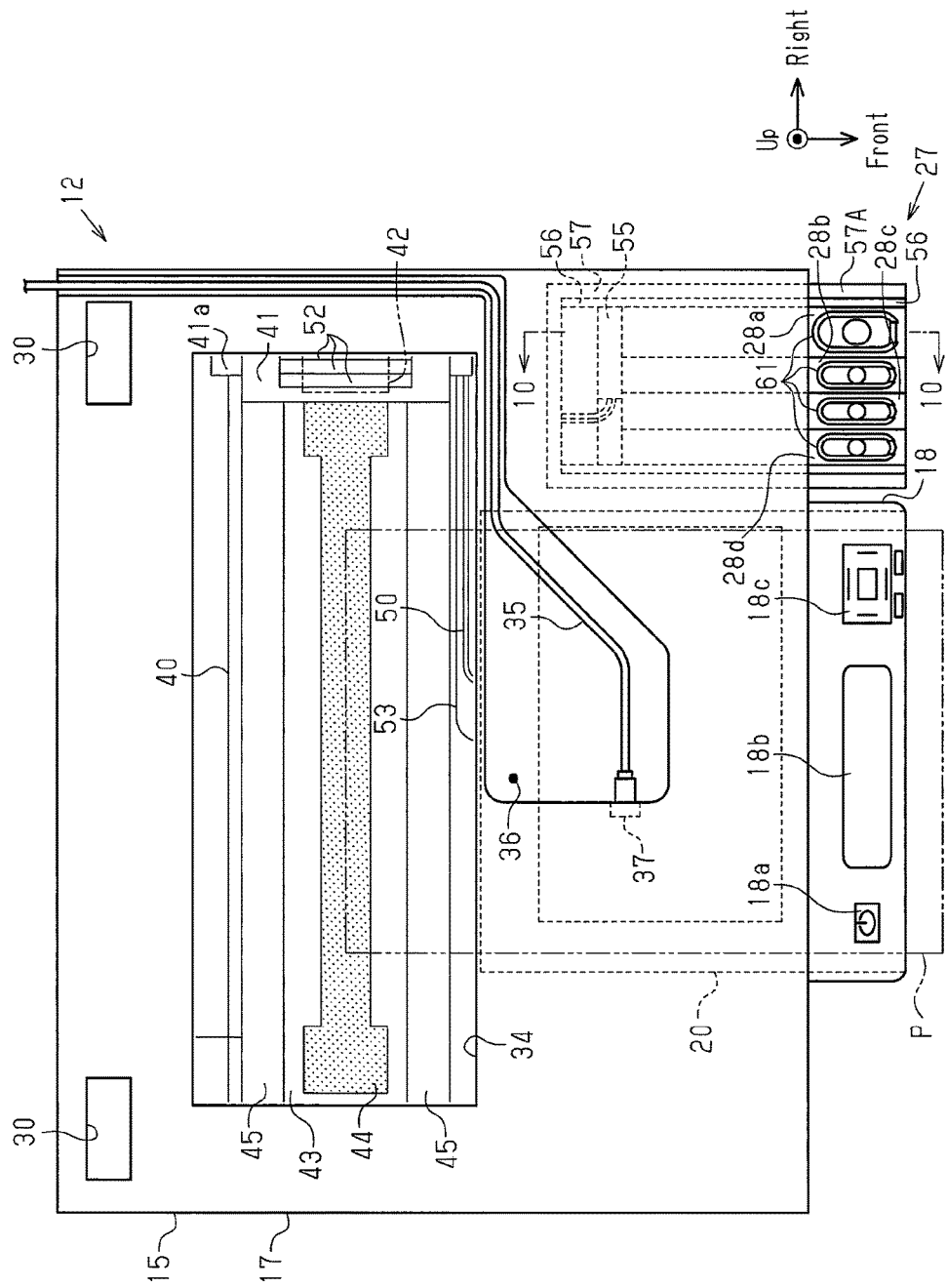
FIG. 9 is a plan view of the printing device in the all-in-one machine of FIG. 8.

As shown in FIGS. 8 and 9, the liquid inlets 61 are arranged in a single line in the lateral direction on the upper surfaces of the liquid containers 28 projecting from the lower shell 16 outside the shell 15. The liquid inlets 61 are each formed so that the opening width of the second opening 61b in the lateral direction is smaller than the width of the upper wall 60 in the lateral direction. The width of the second opening 61b in the front-rear direction is larger than the opening width of the second opening 61b in the lateral direction and larger than the opening width of the upper wall 60 in the lateral direction. Thus, the liquid inlet 61 is elliptic and elongated in the front-rear direction.

As shown in FIG. 9, the printing device includes a printing unit that performs printing with a liquid on a medium, the liquid containers 28 with the liquid containing chambers 59 capable of holding the liquid supplied to the printing unit, and a liquid reception portion 61 having an inner end opening 61a that opens in each liquid containing chamber 59 and an outer end opening 61b that is opposite to the inner end opening 61a. Further, as shown in FIG. 9, in the outer end opening 61b, an opening plane of the outer end opening 61b has a width in a first direction (width in lateral direction) and a width in a second direction orthogonal to the width of the first direction (width in front-rear direction in the present embodiment). The width in the second direction is greater than the width in the first direction. The width in the second direction is greater than the width of the liquid containing chamber 59 in the first direction (slightly smaller than the width of the liquid container 28 for an amount corresponding to the wall width), which is in communication with the liquid reception portion 61.

As shown in FIG. 9, the liquid containers 28 are arranged next to one another in the first direction (lateral direction). The first direction corresponds to the layout direction of the liquid containers 28.

Figure 10:
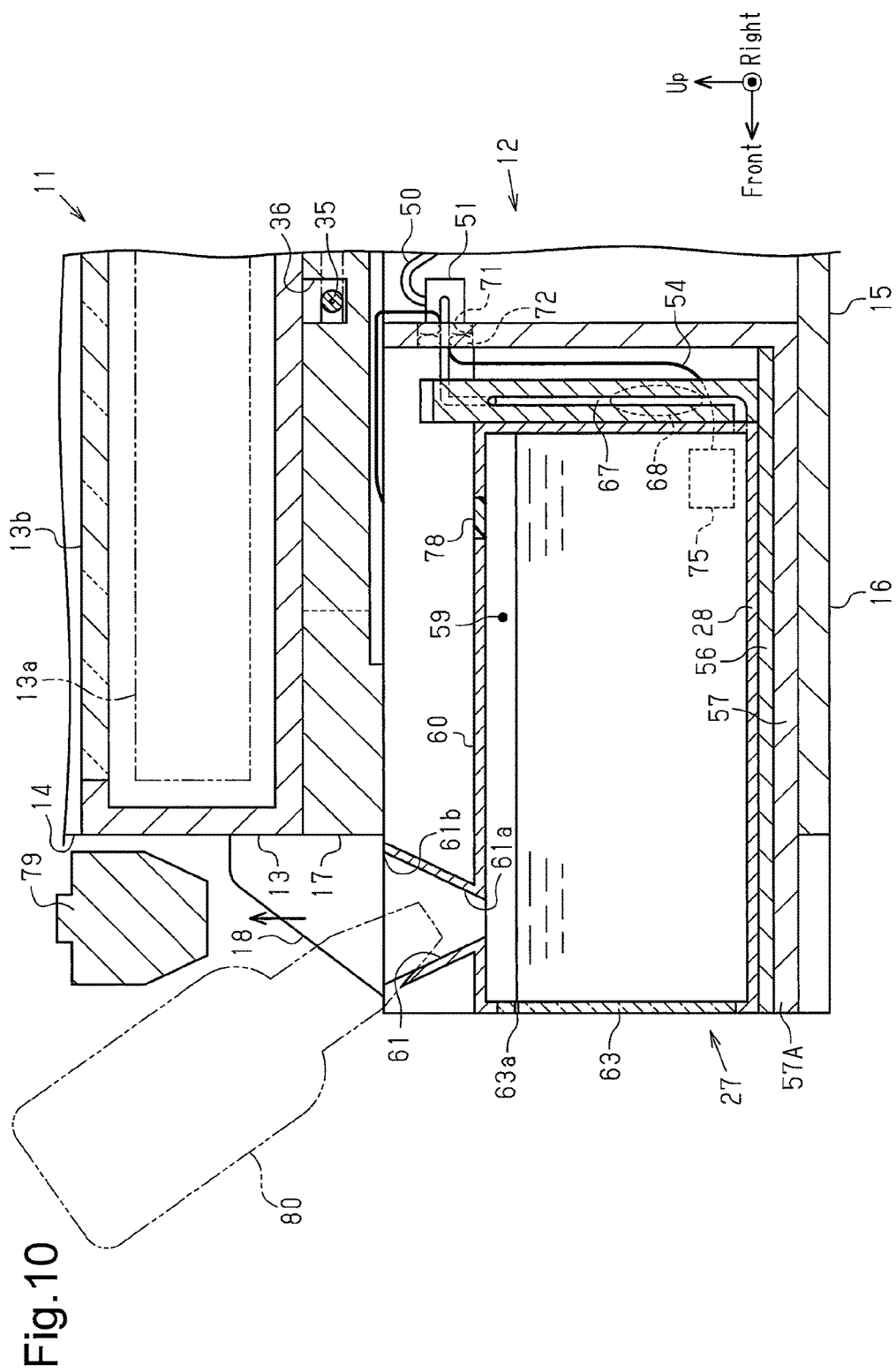
FIG. 10 is a partially, cross-sectional view taken along line 10-10 in FIG. 9.

Ink is added to the embodiment of FIG. 9 as shown in FIG. 10.

The liquid supply unit 27, which includes the liquid containers 28 and the setting member 56, is held by the holding member 57, which covers the liquid containers 28 from the right side, the left side, and the bottom side of the liquid containers 28. The holding member 57 also functions as a protection member 57A that protects the liquid containers 28 from external impact outside the shell 15. The protection member 57A has a front surface and an upper surface that are open. Further, the holding member 57 is configured so that the visual checking portion 63 formed in each liquid container 28 is not covered when viewed from the front. The liquid inlet 61 of each liquid container 28 is exposed to the outside from the upper surface of the protection member 57A.

The operation of the printing device 12 and the liquid supply unit 27 (liquid supply device) in the second embodiment will now be described.

As shown in FIG. 10, the liquid inlet 61 formed in the upper wall 60, which is the upper surface of each liquid container 28, is configured so that the second opening 61b widely opens in the front-rear direction at the side that is farther from the liquid containing chamber 59. This allows the ink bottle 80 to be diagonally inserted from the front into the liquid inlet 61 when supplying ink to the liquid container 28. Thus, the liquid container 28 in the second embodiment is configured so that ink can be supplied more easily than the first embodiment in which the ink bottle 80 is inserted straight from above into the liquid inlet 61.

The printing device 12 and the liquid supply unit 27, which serves as a liquid supply device, in the second embodiment have the advantages described below.

(21) The liquid containers 28 are partially accommodated in the shell 15. This decreases the area occupied by the entire device in comparison with when the liquid containers 28 are entirely located outside the shell 15. Thus, the printing device 12 can be used when not much area is available. This improves the convenience.

(22) The liquid inlet 61 is located at a portion of each liquid container 28 that projects out of the shell 15. Thus, the user can easily add liquid.

(23) The portion of each liquid container 28 projecting out of the shell 15 in the forward direction (projecting portion) is covered by the holding member 57 that also projects out of the shell 15 in the forward direction. More specifically, the holding member 57 functions as the protection member 57A that covers the liquid containers 28. The protection member 57A limits displacement of each liquid container 28 that would occur when an object strikes the projecting portion from the outer side.

(24) The protection member 57A, which protects the liquid containers 28, has an open upper surface. Thus, when ink becomes low in each liquid container 28, ink may be added from the liquid inlet 61, which is exposed to the outside through the upper surface of the protection member 57A, to continuously perform printing.

(25) The projection amount of the liquid supply unit 27 from the shell 15 in the forward direction is smaller than the projection amount of the paper ejection tray 20 and the paper feed cassette 22. This reduces situations in which an object strikes the liquid containers 28 from the outer side. As a result, displacement of each liquid container 28 is limited.

(26) In the liquid inlet 61, the opening width of the second opening 61b, which is located at the side opposite to the first opening 61a serving as the inner end opening, in the direction intersecting the layout direction of the liquid containers 28 is larger than the opening width of the second opening 61b in the layout direction. This allows for reduction in size in the layout direction of the liquid containers 28 and limits enlargement of the printing device 12.

The first embodiment and the second embodiment may be modified as described below.

In the printing device 12 of the first embodiment, the operation panel 18 may be extended toward the right to the front side of the hand insertion portion 29 so that the open portions 32 are located at the rear side of the operation panel 18 when viewing the shell 15 from the front side. This hides the open portions 32 with the operation panel 18 so that the open portions 32 cannot be seen from the front side of the printing device 12 and improves the aesthetic appeal of the printing device 12.

With the printing device 12 of the second embodiment, in the liquid inlet 61 of each liquid container 28, the opening width of the second opening 61b, which is located at the side opposite to the first opening 61a (inner end opening), in the layout direction of the liquid containers 28 may be larger than the opening width in the direction intersecting the layout direction. In this configuration, for example, if the liquid ejection head 42 is configured to perform printing on the paper P while moving in the main scanning direction and the liquid containers 28 are arranged next to one another in the scanning direction, the opening width of the second opening 61b in the liquid inlet 61 is large at the side opposite to the first opening 61a (inner end opening). Thus, liquid can be easily added from the liquid inlet 61.

Figure 11:
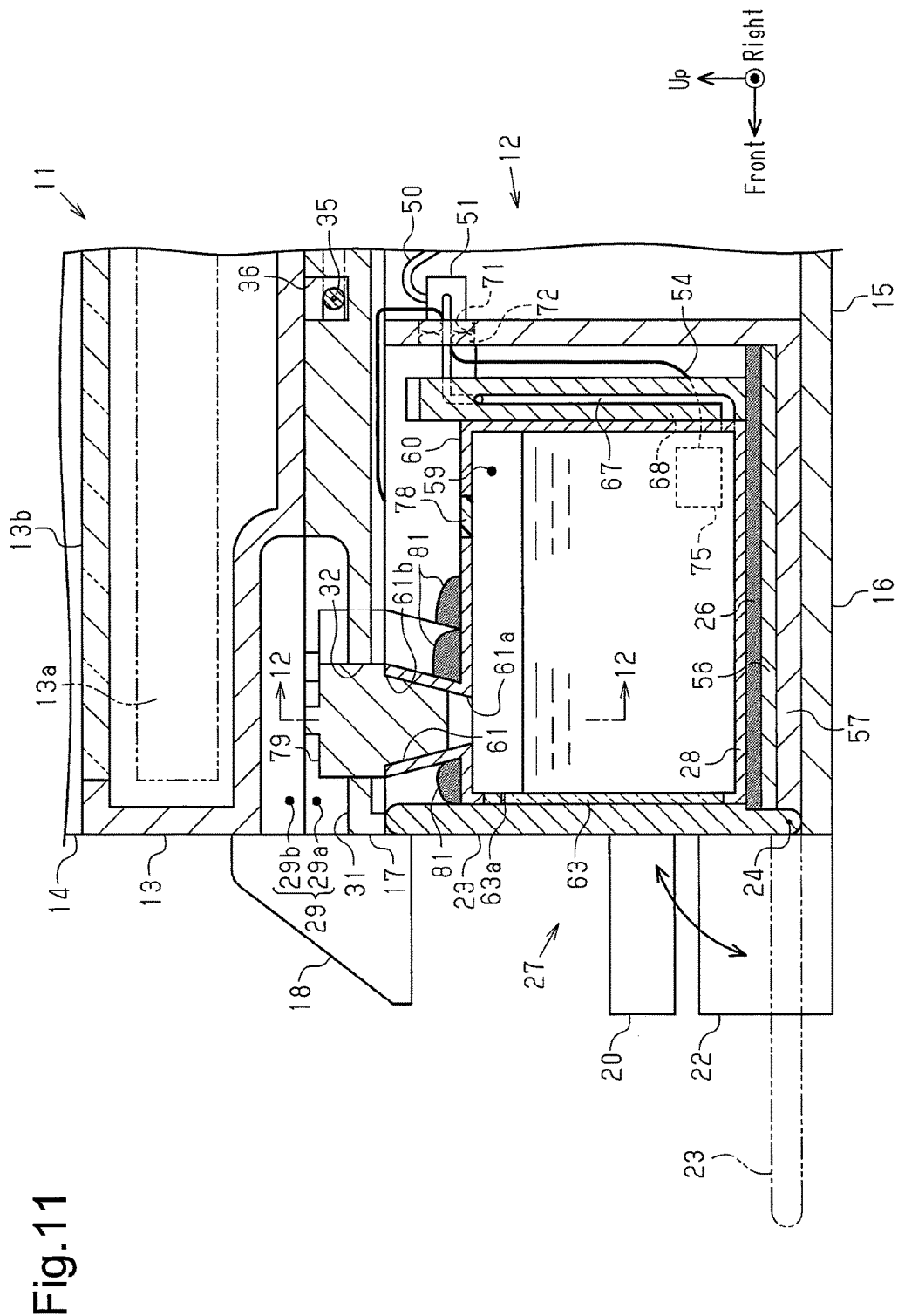
FIG. 11 is a cross-sectional view showing a portion where a liquid supply device is located in a printing device of a modified example.

For example, as shown in FIG. 11, when the seal member 76 is not arranged between the liquid inlet 61 of each liquid container 28 and the open portion 32 corresponding to (vertically opposed to) the liquid inlet 61 in the upper shell 17, a liquid absorbent 81 may be arranged at the base of the liquid inlet 61. With this configuration, even if ink is spilt around the liquid inlet 61 when adding ink through the liquid inlet 61 to the liquid container 28, the liquid absorbent 81 absorbs and holds the spilt ink.

Figure 12:
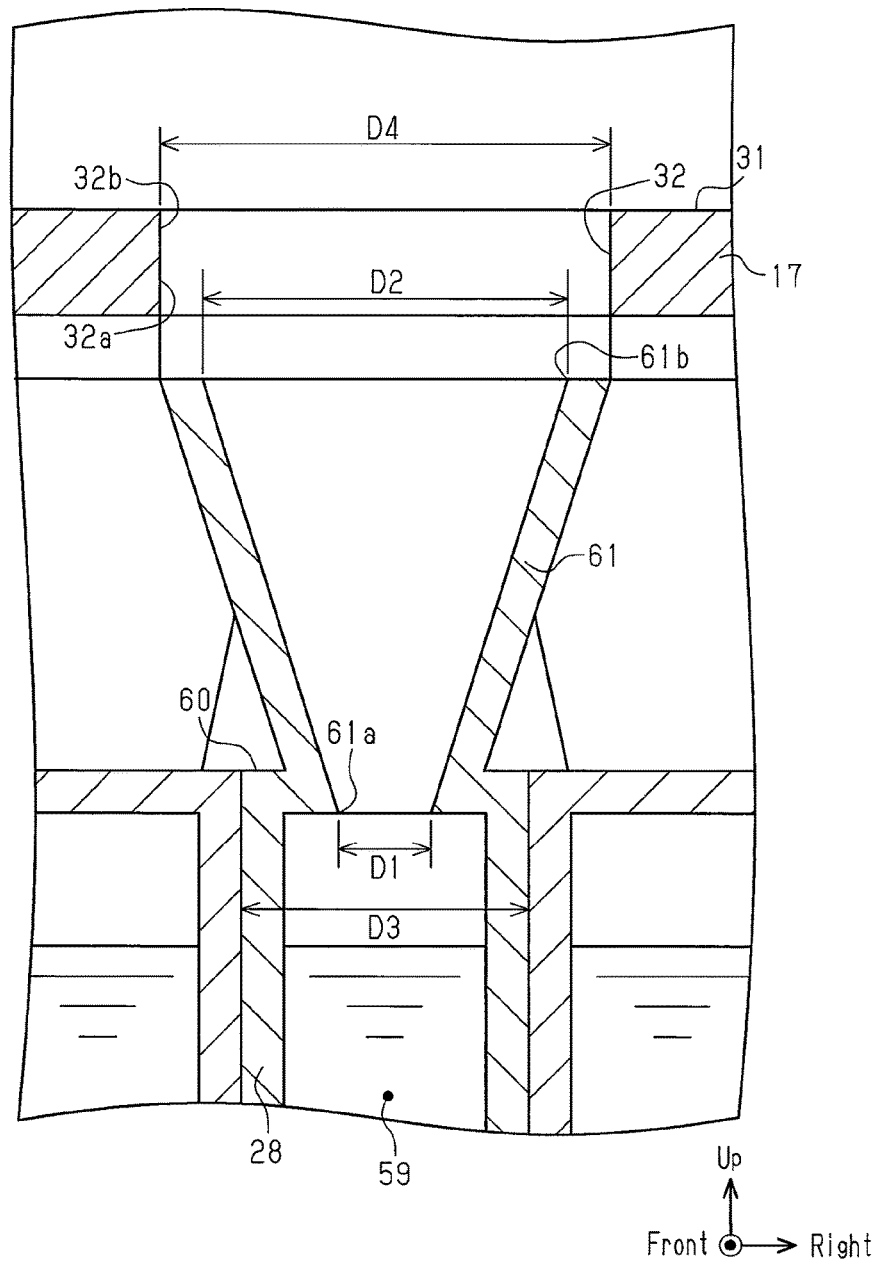
FIG. 12 is a partially, cross-sectional view taken along line 12-12 in FIG. 11.

For example, as shown in FIG. 12, the liquid inlet 61 of each liquid container 28 may be located immediately below the corresponding open portion 32 of the upper shell 17 opposing the open portion 32 without the seal member 76 arranged between the liquid inlet 61 and the wall of the open portion 32, and the opening width D4 of the fourth opening 32b of the open portion 32 may be larger than the opening width D2 of the second opening 61b of the liquid inlet 61. In this case, when the user adds ink to the liquid container 28, a liquid adding member or the like is aligned with the open portion 32 of the upper shell 17 (exterior member) that is larger than the liquid inlet 61 in one direction (for example, layout direction of the liquid containers 28 of the direction of the short side of the upper wall 60, which is the opening formation wall including the inner open end of the liquid container 28). This allows ink to be easily added.

For example, as shown in FIGS. 13A to 13D, the printing device 12 may include the image reading device 13 and a document cover 13A that are arranged on the shell 15. That is, the all-in-one machine may include the document cover 13A instead of the automatic paper feeding device 14.

Figure 13A:
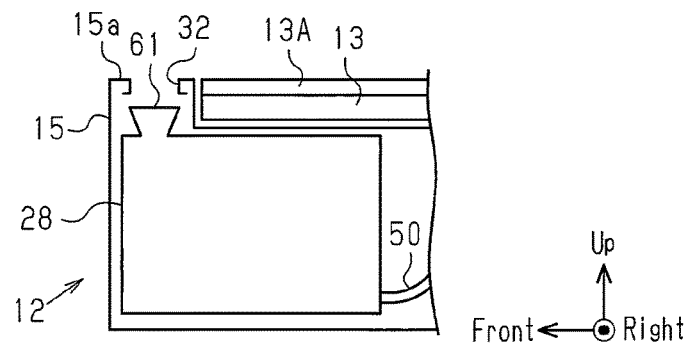
FIG. 13A is a schematic diagram of a modified example in which a liquid intake opening is formed at a different position in the shell of the printing device.

In the printing device 12, the location of the liquid-adding open portions 32 formed in the shell 15 are not limited to the positions illustrated in the first embodiment and the second embodiment. For example, as shown in FIG. 13A, the open portion 32 (fourth opening 32b, which is the outer end opening of the liquid reception portion) may be formed in an opening formation surface 15a, which extends in the horizontal direction at substantially the same height as the document cover 13A, in front of the image reading device 13 without facing the lower surface of the image reading device 13 that is arranged at the close position. Further, as shown in FIG. 13B, the open portion 32 (fourth opening 32b, which is the outer end opening of the liquid reception portion) may be formed in the opening formation surface 15a, which is an inclined surface that is sloped down toward the front, in front of the image reading device 13 without facing the lower surface of the image reading device 13 that is arranged at the close position.

Figure 13B:
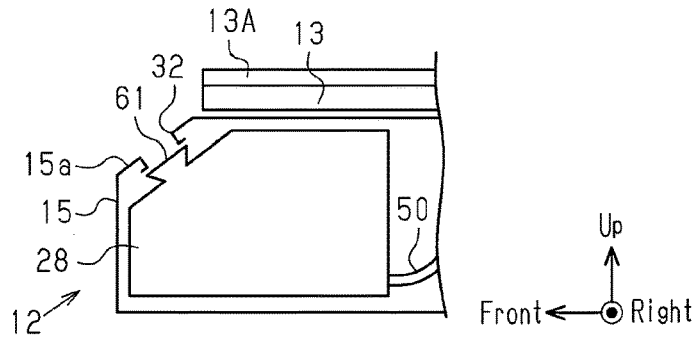
FIG. 13B is a schematic diagram of a further modified example in which a liquid intake opening is formed at a different position in the shell of the printing device.
Figure 13C:
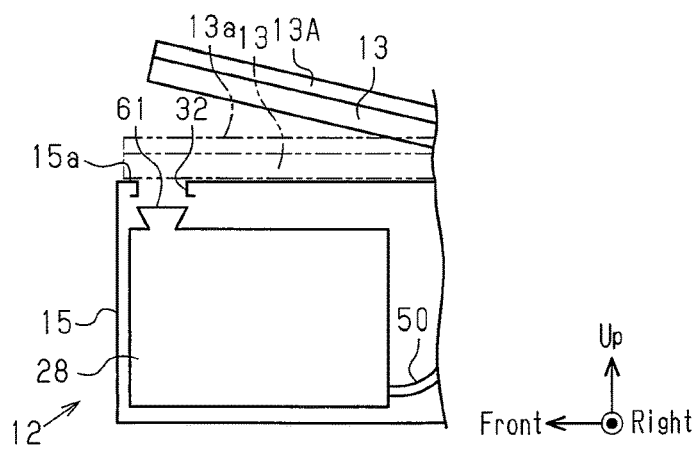
FIG. 13C is a schematic diagram of a further modified example in which a liquid intake opening is formed at a different position in the shell of the printing device.
Figure 13D:
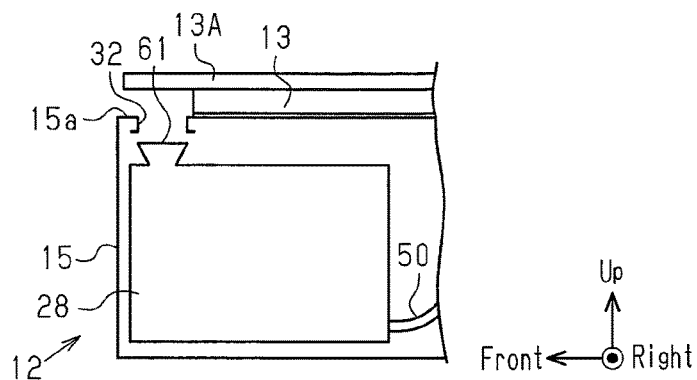
FIG. 13D is a schematic diagram of a further modified example in which a liquid intake opening is formed at a different position in the shell of the printing device.

Further, as shown in FIG. 13C, the open portion 32 may be formed in the opening formation surface 15a, which is a horizontal surface opposing the lower surface of the image reading device 13 that is located at the close position at a position located near the front surface of the shell 15. Further, as shown in FIG. 13D, the open portion 32 (fourth opening 32b, which is the outer end opening of the liquid reception portion), may be formed in the opening formation surface 15a, which is a horizontal surface distanced from the lower surface of the distal portion of the document cover 13A in front of the image reading device 13 without facing the lower surface of the image reading device 13 that is arranged at the close position.

In the cases of FIGS. 13A and 13B, the liquid containers 28 may be filled with ink (liquid) from the liquid inlets 61 through the open portions 32 (fourth opening 32b, which is the outer end opening of the liquid reception portion), which is exposed to the outside, without the need to open and move the image reading device 13 from the close position to the open position. In the case of FIG. 13C, the image reading device 13 that is located at the close position constantly conceals the liquid inlets 61. This avoids situations in which the user inadvertently touches the liquid reception portion. Further, in the case of FIG. 13C, the plug 79 of the liquid inlet 61 may be arranged on the document cover 13A at the side facing the liquid inlet 61. In the case of FIG. 13D, a hand insertion portion is formed between the opening formation surface 15a and the document cover 13A. This facilitates the opening of the document cover 13A.

Figure 14A:
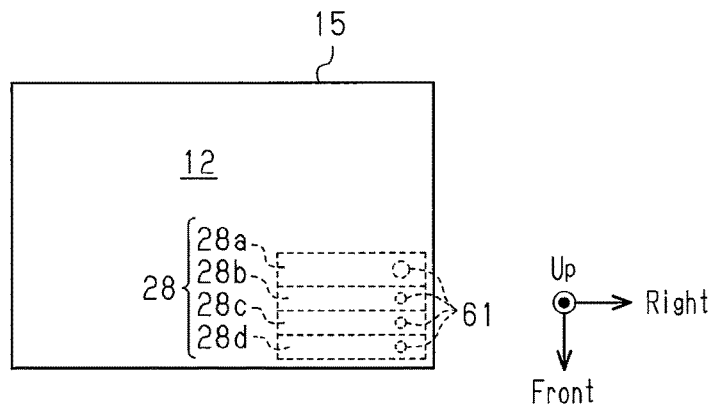
FIG. 14A is a schematic diagram showing a modified example of an arrangement of liquid containers attached to the shell of the printing device and illustrating one case of a side surface attachment arrangement.
Figure 14B:
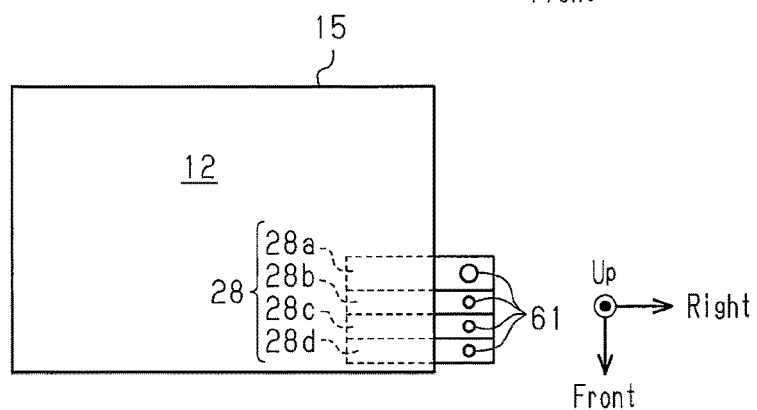
FIG. 14B is a schematic diagram showing a further modified example of an arrangement of the liquid containers attached to the shell of the printing device and illustrating another case of a side surface attachment mode.

The liquid containers 28 do not have to be attached to the shell 15 of the printing device 12 as illustrated in the first embodiment and the second embodiment. For example, as shown in FIGS. 14A and 14B, the liquid containers 28 (28a to 28d) may be attached to the shell 15 in a side surface attachment arrangement in which the longitudinal direction of the liquid containers 28 conform to the lateral direction, which is orthogonal to the front-rear direction that conforms to the rearward direction of the shell 15. In this case, the liquid containers 28 (28a to 28d) are entirely or partially accommodated in the shell 15. In other words, the liquid containers 28 (28a to 28d) may be projected out of the shell 15 but does not have to be projected out of the shell 15.

In this case, the outer end opening of the liquid reception portion (outer end opening of open portion formed in upper shell in the case of FIG. 14A, opening opposite to inner end opening of liquid inlet located outside shell in the case of FIG. 14B) is located near the side surface of the shell 15. This is advantageous in that ink can easily be added from the side surface. In the first embodiment and the second embodiment, the outer end opening of the liquid reception portion (outer end opening of the open portions 32 formed in the upper shell 17 or opening of the liquid inlet 61 that is opposite to inner end opening at the front of the shell 15) is located near the front surface of the shell 15. This is advantageous in that ink can easily be added from the front surface.

Figure 14C:
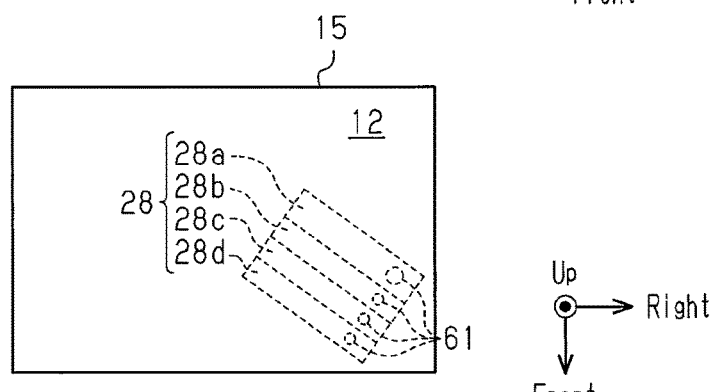
FIG. 14C is a schematic diagram showing a further modified example of an arrangement of the liquid containers attached to the shell of the printing device and illustrating one case of a diagonal attachment mode.
Figure 14D:
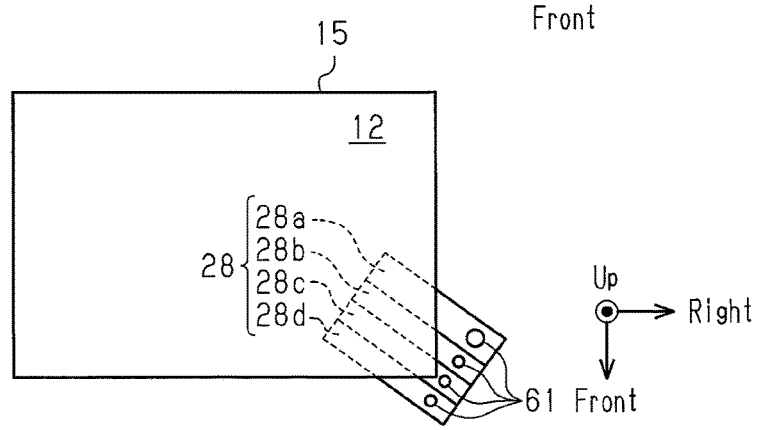
FIG. 14D is a schematic diagram showing a further modified example of an arrangement of the liquid containers attached to the shell of the printing device and illustrating another case of a diagonal attachment mode.

Further, as shown in FIGS. 14C and 14D, the liquid containers 28 may be attached to the shell 15 in a diagonal attachment arrangement in which the longitudinal direction of the liquid containers 28 is diagonal to the front-rear direction, which conforms to the rearward direction, and the lateral direction, which is orthogonal to the front-rear direction. In this case, the liquid containers 28 (28a to 28d) may be entirely or partially accommodated in the shell 15. In other words, the liquid containers 28 (28a to 28d) may be projected out of a corner of the shell 15 where the front surface and the side surface intersect but does not have to be projected out of the corner of the shell 15.

Figure 15:
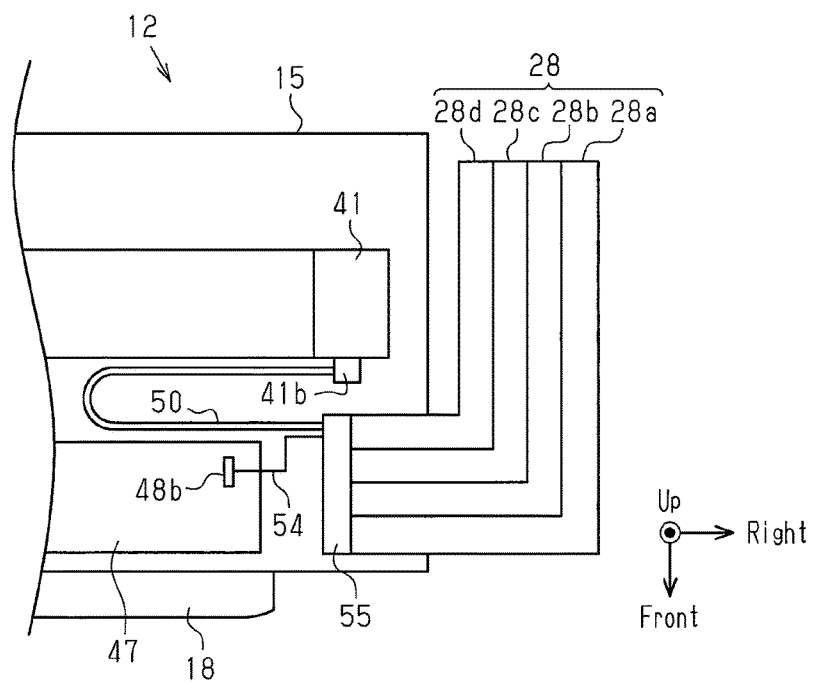
FIG. 15 is a schematic plan view showing another modified example of liquid containers attached to the shell of the printing device.
Figure 16A:
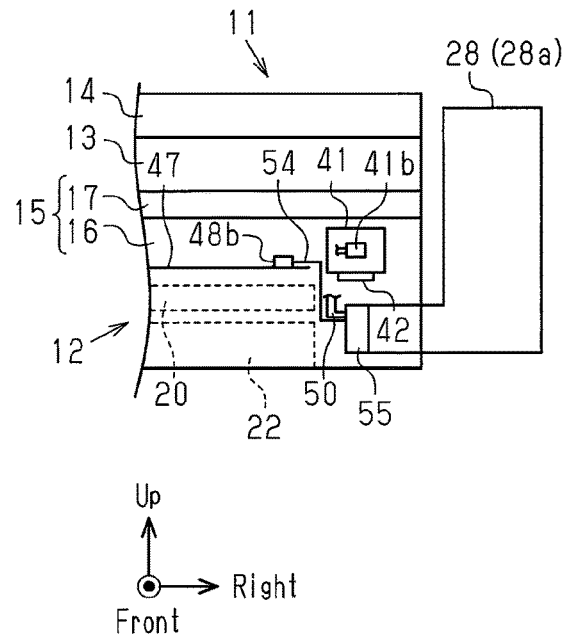
FIG. 16A is a schematic front view showing another modified example of liquid containers attached to the shell of the printing device.
Figure 16B:
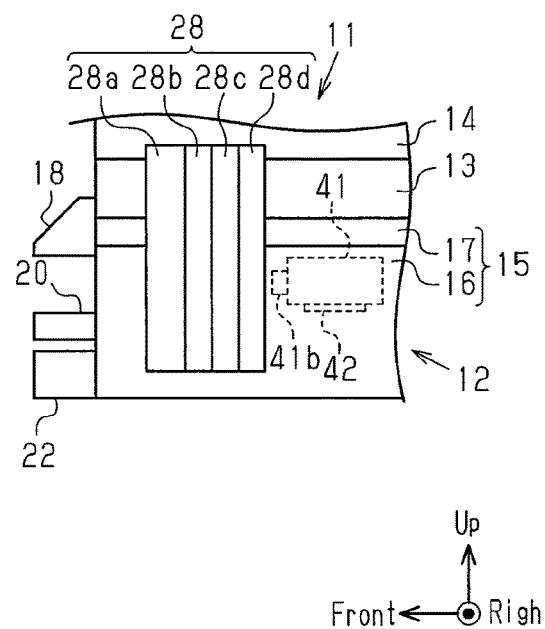
FIG. 16B is a schematic right view of the modified example shown in FIG. 16A.

The shape of the liquid containers 28 attached to the shell 15 of the printing device 12 is not limited to the form of substantially rectangular parallelepiped as illustrated in the first and second embodiments. For example, as shown in FIG. 15, the liquid containers 28 attached to the shell 15 may be shaped to extend out of the shell 15 in the right direction and bend toward the rear along the right surface of the shell 15 outside the shell 15. Further, as shown in FIGS. 16A and 16B, the liquid containers 28 attached to the shell 15 may be shaped to extend out of the shell 15 in the right direction and bend upward along the right surface of the shell 15 outside the shell 15. More ink can be held in the liquid containers 28 illustrated in FIGS. 15, 16A, and 16B than the liquid containers 28 of the first and second embodiments. Although not shown in the drawings, the liquid containers 28 illustrated in FIGS. 15, 16A, and 16B each include a liquid inlet.

Figure 17A:
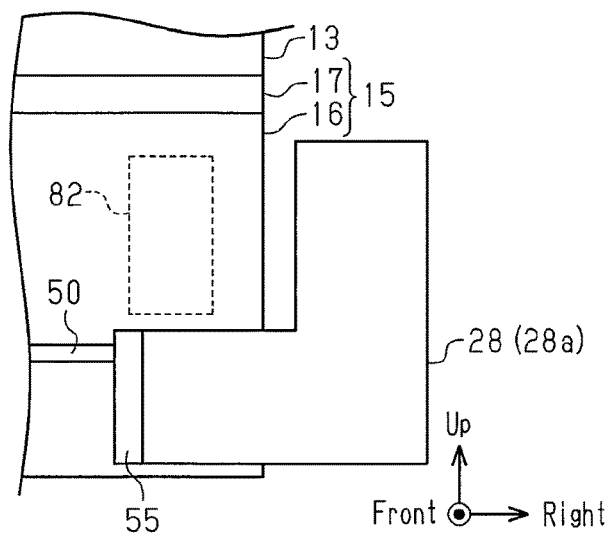
FIG. 17A is a schematic front view showing another modified example of a liquid container, which is of a side surface projecting type, attached to the shell of the printing device.
Figure 17B:
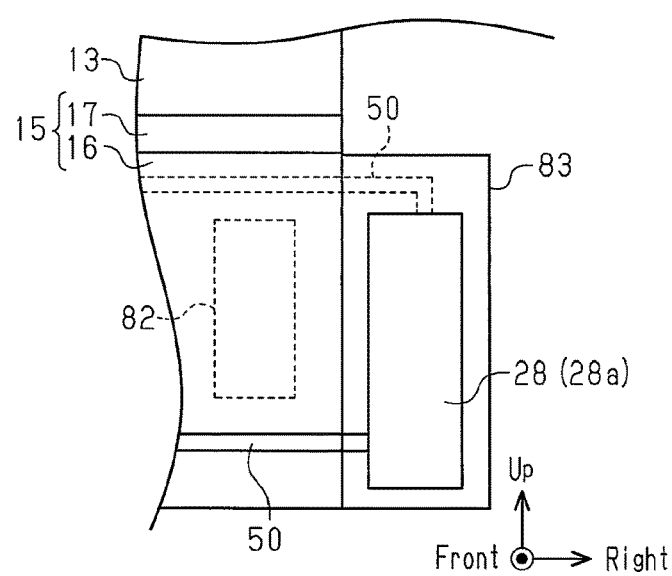
FIG. 17B is a schematic front view showing another modified example of a liquid container, which is of an outer side surface attachment type, attached to the shell of the printing device.

As shown in FIG. 17A, for example, when the liquid container 28 has a larger volume than that of the first embodiment and the second embodiment and is partially accommodated in the shell 15, a functional member 82, such as an ink absorbent that absorbs ink, may be arranged at a position above each liquid container 28 in the shell 15. Further, as shown in FIG. 17B, when attaching a large-volume liquid container 28, which serves as a liquid supply device, to the outer side of the shell 15 in a state covered by a liquid container housing 83 that functions as an exterior member, the functional member 82, such as an ink absorbent, may be arranged above the liquid container 28 in the shell 15. Although not shown in the drawings, the liquid containers 28 illustrated in FIGS. 17A and 17B each include a liquid inlet.

Figure 18:
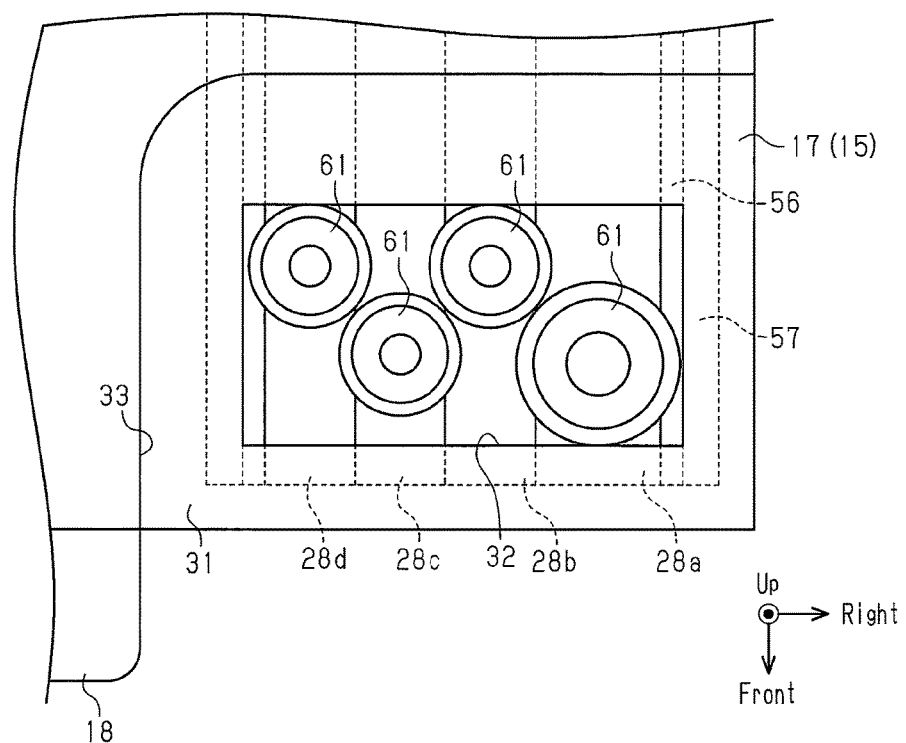
FIG. 18 is a partial plan view showing a modified example of an opening formed in the shell of the printing device.

The open portions 32 formed in the upper shell 17 of the shell 15 of the printing device 12 expose the liquid inlets 61 to the outside as viewed from above. However, each open portion 32 does not necessarily have to expose a single liquid inlet 61. For example, as shown in FIG. 18, when viewed from above, the four liquid inlets 61 of four liquid containers 28 may all be exposed to the outside from a single open portion 32 that is rectangular and formed in the upper shell 17. In this case, the open portion 32 has an opening width in the lateral direction conforming to the layout direction of the liquid containers 28 that is larger than the opening width in the front-rear direction intersecting the layout direction. Thus, liquid can easily be added from the liquid inlets 61.

Figure 19:
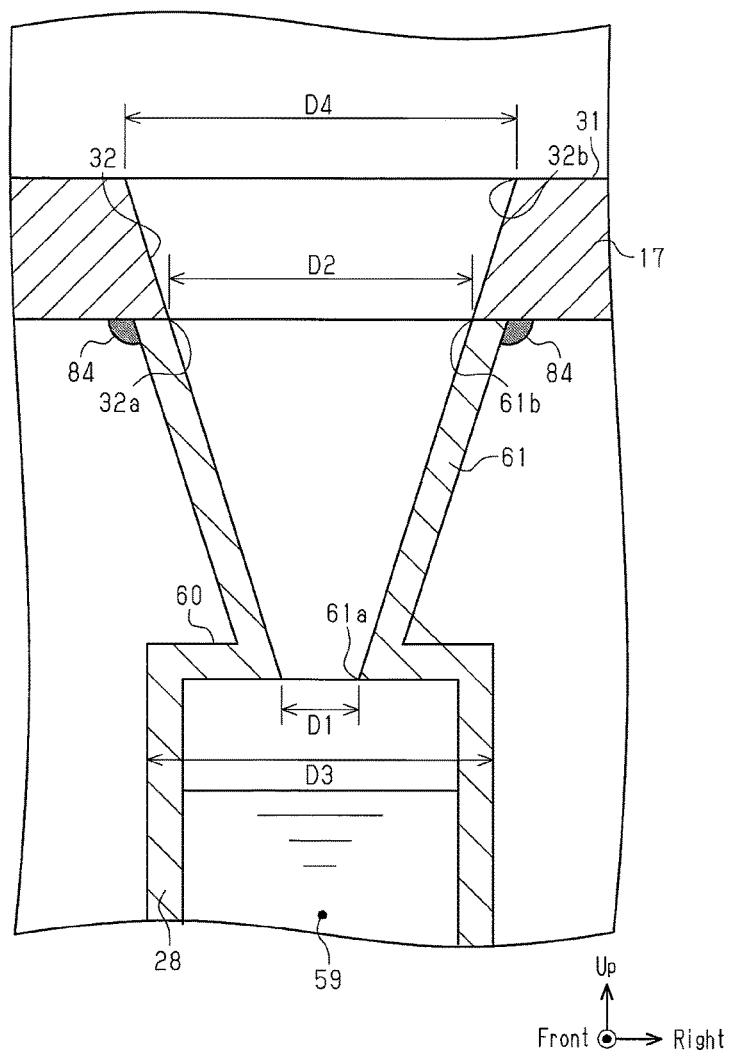
FIG. 19 is a schematic view of a modified example showing the positional relationship of an opening formed in a shell of the printing device and a liquid inlet of the liquid container.

As shown in FIG. 19, for example, the open portion 32 of the upper shell 17 and the liquid inlet 61 of the liquid container 28 may be configured to have the form of a continuous funnel. More specifically, with the lower surface of the upper shell 17 held in contact with the upper end of the liquid inlet 61, the open portion 32 of the upper shell 17 is formed to include the inner third opening 32a, which opens with a diameter that is substantially the same as the opening width D2 of the second opening 61b, and the fourth opening 32b, which is the outer end opening located at the opposite side and opens with the opening width D4 that is greater than the width D3 of the liquid container 28. In this configuration, ink can easily be added from the wide open portion 32. Further, in this configuration, preferably, a seal 84 that prevents ink leakage is coupled to a location where the upper shell 17 and the liquid inlet 61 are in contact with each other.

Figure 20:
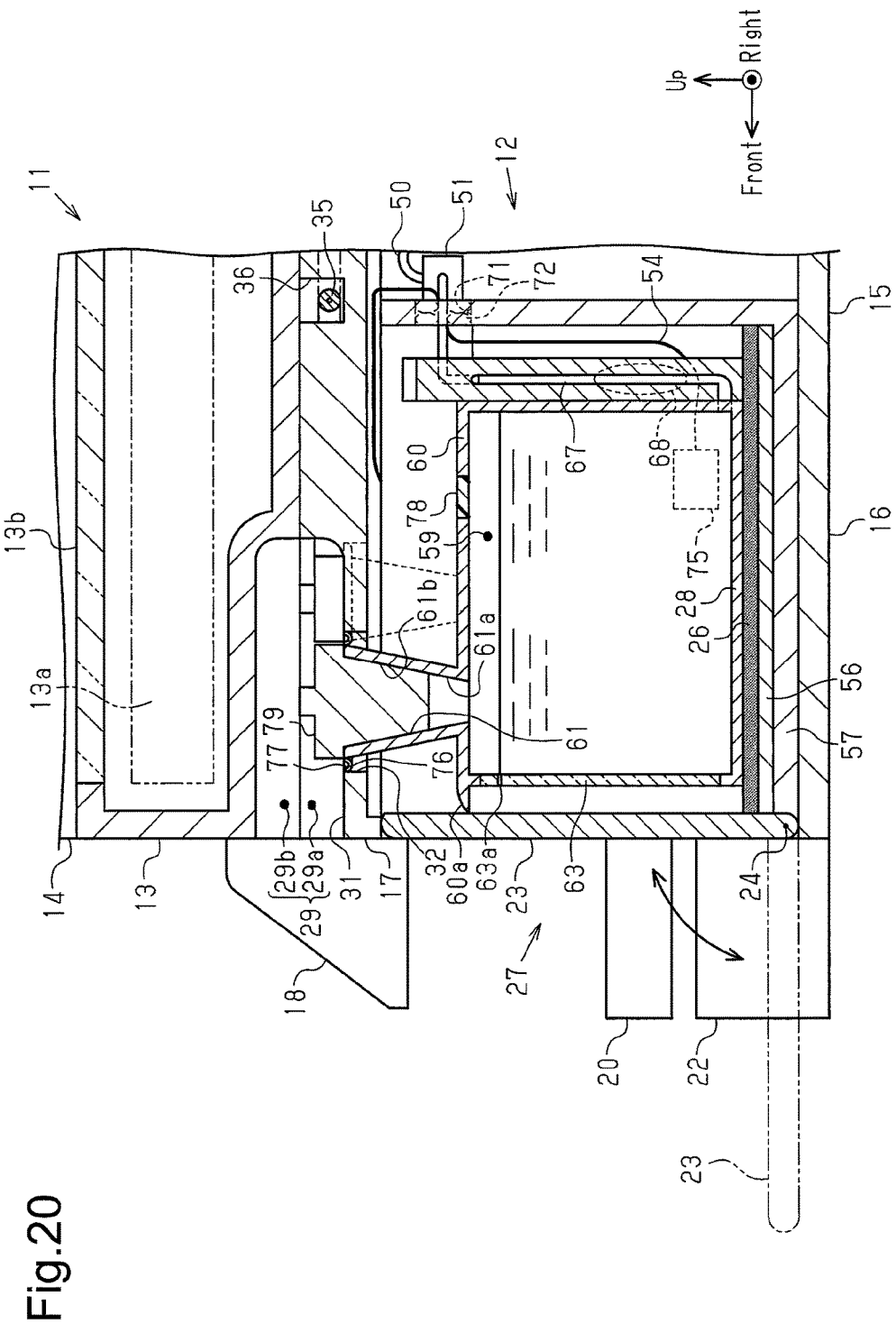
FIG. 20 is a schematic cross-sectional view showing a modified example of the liquid container.

As shown in FIG. 20, for example, in the printing device 12, the liquid container 28 may include a flow restriction 60a that slightly projects from the upper wall 60 of the liquid container 28 in the front direction. In this configuration, if the ink absorbent 26 is not arranged on the rear surface of the lid 23 and ink flows to the front wall 62 of the liquid container 28, the ink will collect and smear the visual checking portion 63 in the front wall 62. In such a case, the amount of remaining ink in the liquid container 28 cannot be checked. Thus, the arrangement of the flow restriction 60a that projects in the forward direction from the upper wall 60 to a position where the flow restriction 60a contacts the lid 23 restricts the flow of ink to the front wall 62 and reduces situations in which the visual checking portion 63 is smeared.

Figure 21:
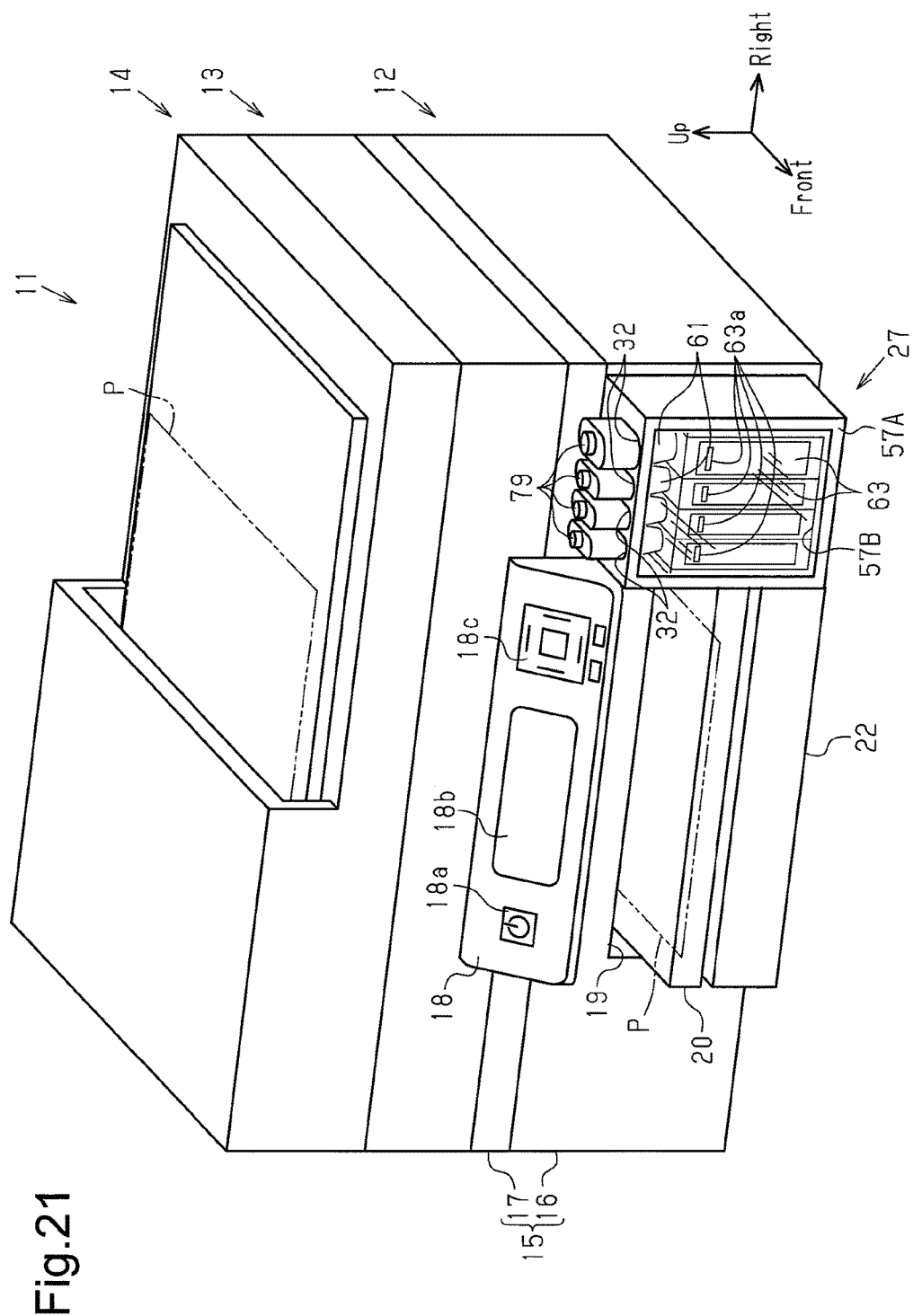
FIG. 21 is a perspective view showing a modified example of a protection member.

In the printing device 12, when projecting the holding member 57, which holds the liquid containers 28, out of the front side of the shell 15 to function as the protection member 57A, for example, as shown in FIG. 21, the holding member 57 may cover the front side and the upper side of the liquid containers 28 more than the configuration shown in FIG. 8. Preferably, in this case, the open portions 32 are formed in the upper surface of the holding member (protection member 57A), and the front surface of the holding member 57 includes a window 57B so that the remaining amount of ink in the liquid containers 28 can be checked through the visual checking portions 63 from outside the holding member 57 (protection member 57A). In this case, the window 57B may include the upper limit portion 63a to inform the user of the upper limit of ink.

Further, the lid 23 shown in FIGS. 5 and 7 may be used to cover the front side of the liquid containers 28 shown in FIG. 8. In this case, the ink absorbent 26, which is one example of a liquid absorbent formed by a foamed material or the like such as polyurethane that is capable of absorbing and holding ink, may be attached to the rear surface of the lid 23.

Figure 22A:
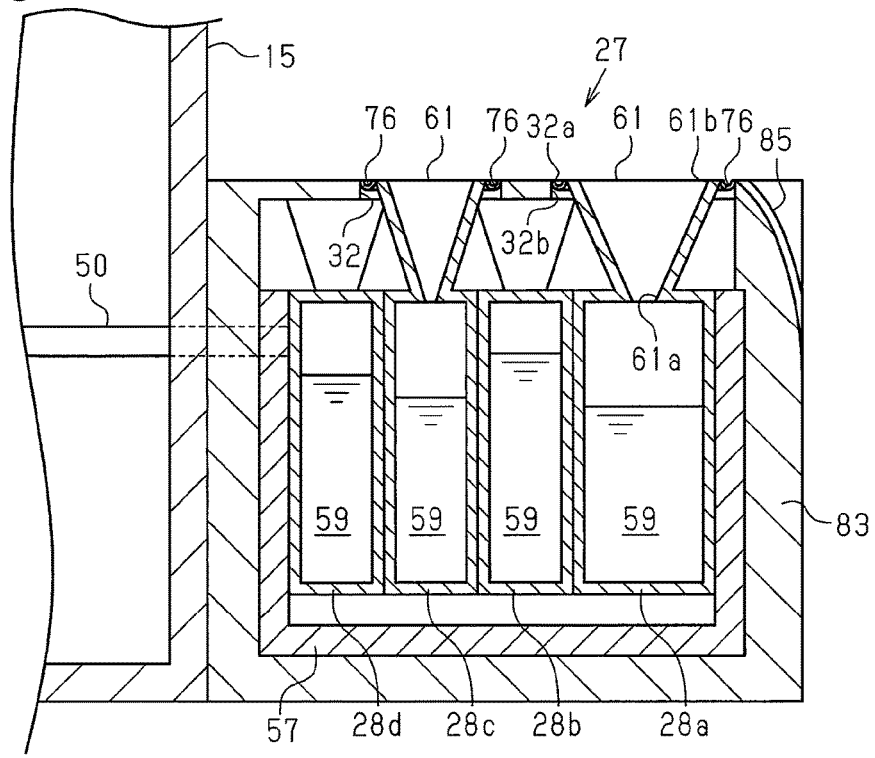
FIG. 22A is a schematic cross-sectional front view taken along line 22A-22A in FIG. 22B and showing a modified example of a liquid supplying device attached to the outside of the printing device.
Figure 22B:
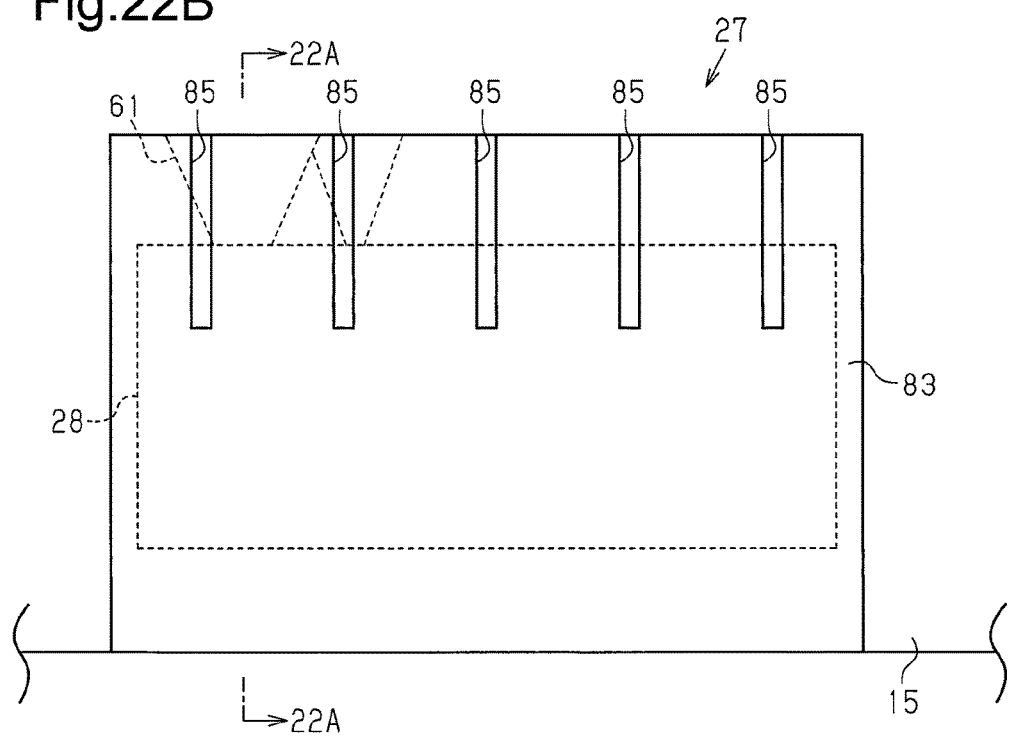
FIG. 22B is a schematic right view of the modified example shown in FIG. 22A.

In the printing device 12, for example, as shown in FIGS. 22A and 22B, the liquid supply unit 27, which serves as the liquid supply device attached to the outside of the shell 15, may include a mechanism for guiding the ink leaking onto the seal member 76 out of the liquid supply unit 27 when filling the liquid containers 28 with ink. More specifically, the liquid container housing 83, which is separate from the shell 15 of the printing device 12 and is one example of an exterior member coupled to the right surface of the shell 15 and accommodating the liquid supply unit 27, includes groove-like liquid guide passages 85 extending in the vertical direction from the upper portion of the right surface located at the opposite side of the left surface that contacts the printing device 12. Thus, when the leaking ink collected on the seal member 76 overflows, the ink is guided toward the right surface of the liquid container housing 83 so that the ink flows downward on the right surface. FIG. 22A is a cross-sectional view taken along line 22A-22A in FIG. 22B.

If the liquid supply unit 27 (liquid supply device) shown in FIGS. 22A and 22B includes a portion (left portion as viewed in the same drawings) arranged in the shell 15, the paper ejection tray 20 and the circuit board 47 would be located at the left side of the liquid supply unit 27. Thus, the flow of ink to the left side of the liquid supply unit 27 would not be desirable. In the liquid supply unit 27 (liquid supply device) shown in FIGS. 22A and 22B, the ink collected on the seal member 76 flows out to the right side of the liquid container housing 83, which is one example of an exterior member. This reduces situations in which the ink collected on the seal member 76 flows to the left side of the liquid container housing 83. This configuration reduces the occurrence of deficient printing in the printing device 12.

In the liquid supply unit 27 (liquid supply device) shown in FIGS. 22A and 22B, the liquid container housing 83, which is one example of an exterior member coupled to the right surface of the shell 15 and accommodating the liquid supply unit 27, may be configured so that there is no wall at its left surface and so that the liquid supply unit 27 covers the liquid containers 28 with the right wall of the shell 15. In other words, the shell 15, which accommodates the liquid ejection head 42 or the like, may partially be used as part of the exterior member of the liquid supply unit 27 (liquid supply device).

Figure 23:
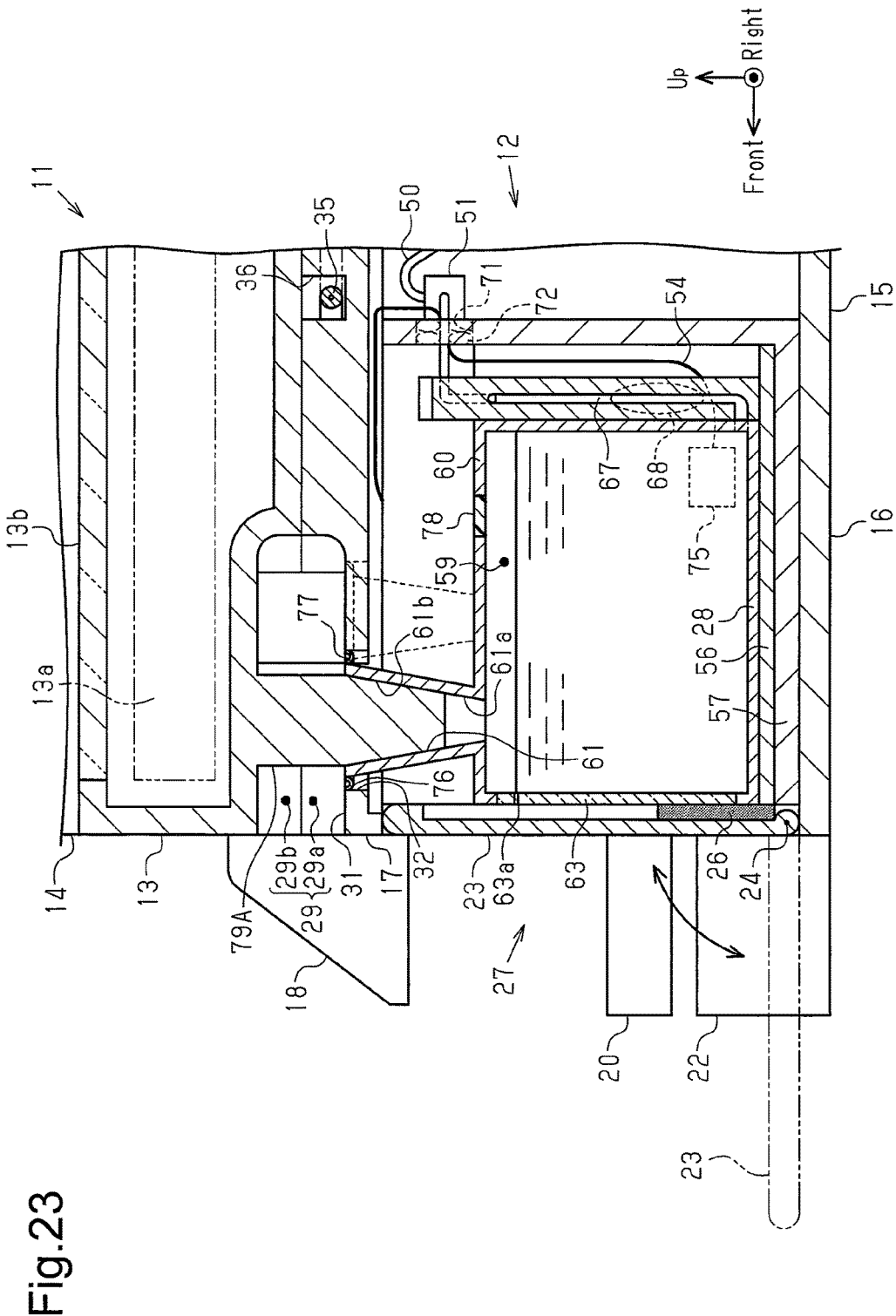
FIG. 23 is a schematic diagram of a modified example in which an image reading device of an all-in-one machine functions as a liquid inlet cover member.

In the above embodiments, as shown in FIG. 23, the plug 79 that closes the liquid inlet 61 of each liquid container 28 may be configured as, for example, a plug 79A that is formed integrally with the lower surface of the image reading device 13. In this configuration, when filling the liquid container 28 with ink, the image reading device 13, which functions as a liquid inlet cover, is moved in the open direction to remove the plug 79A from the liquid inlet 61. In this case, the plug 79A is formed integrally with the image reading device 13. Thus, when the user removes the plug 79A, situations in which the plug 79A gets lost are reduced. In this case, when multiple plugs 79A are integrated with the image reading device 13 and each plug 79A corresponds to the liquid inlet 61 of one of the liquid containers 28a to 28d, the liquid inlets 61 can all be opened or closed by a single opening or closing operation. In addition, the positional relationship of the liquid inlets 61 and the plugs 79A is set. Thus, the plug 79A of one liquid inlet 61 is not used to close another liquid inlet 61. This limits the mixing of colors.

Figure 24A:
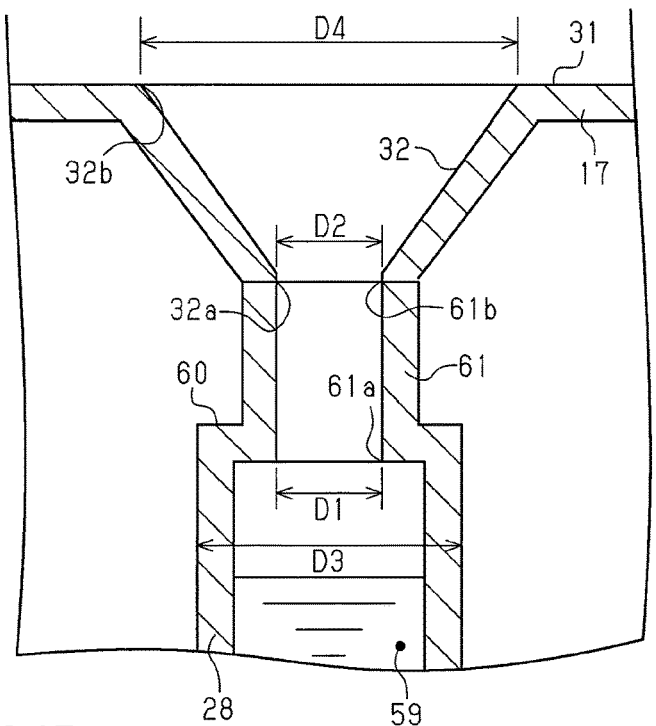
FIG. 24A is a schematic view of a modified example showing the positional relationship of an opening formed in a shell of the printing device and a liquid inlet of the liquid container.
Figure 24B:
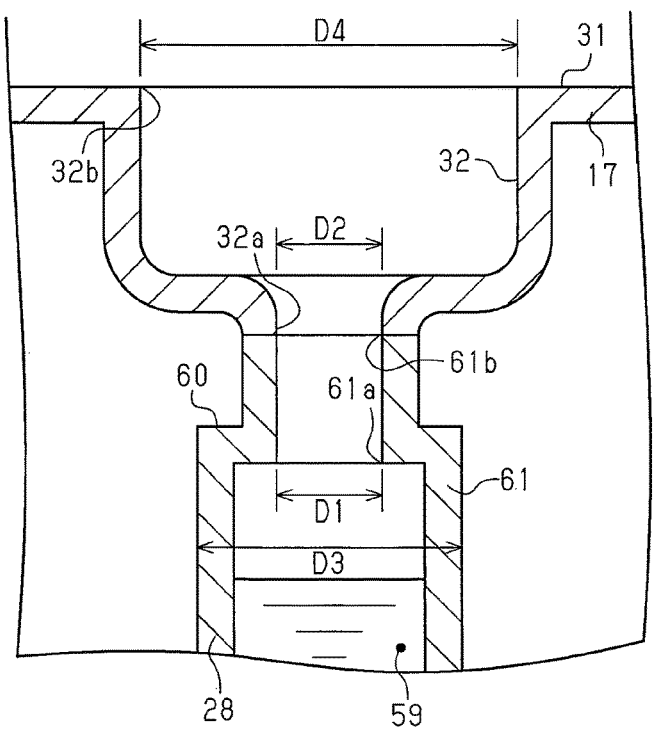
FIG. 24B is a schematic view of a further modified example showing the positional relationship of an opening formed in the shell of the printing device and a liquid inlet of the liquid container.

In the printing device 12, the opening width D2 of the second opening 61b, which is the outer opening of the liquid inlet 61 of the liquid container 28, in the lateral direction does not necessarily have to be greater than the width D3 of the upper wall 60 of the liquid container 28 in the lateral direction. For example, as shown in FIGS. 24A and 24B, the opening width D2 of the second opening 61b may be less that the width D3 of the upper wall 60 of the liquid container 28. More specifically, with the lower surface of the upper shell 17 held in contact with the upper end of the liquid inlet 61, each open portion 32 of the upper shell 17 is formed to include the inner third opening 32a, which has substantially the same diameter as the opening width D2 of the second opening 61b, and the fourth opening 32b, which has the opening width D4 that is greater than the width D3 of the liquid container 28 at the opposite outer end opening. These cases also allow ink to be added from the wide open portions 32. The liquid reception portion may be formed by only the liquid container 28 or by the liquid container 28 and the open portion 32 of the upper shell 17 that is continuous with the liquid container 28. Further, in the liquid inlet 61, only the side closer to the liquid container 28 may be funnel-shaped, only the side closer to the upper shell 17 may be funnel-shaped, or the side closer to the liquid container 28 and the side closer to the upper shell 17 may both be funnel-shaped. Funnel-shaped is not limited to a smooth conical form as shown in FIG. 24A, and may be stepped or be a combination of a cone and a step as shown in FIG. 24B.

Figure 25A:
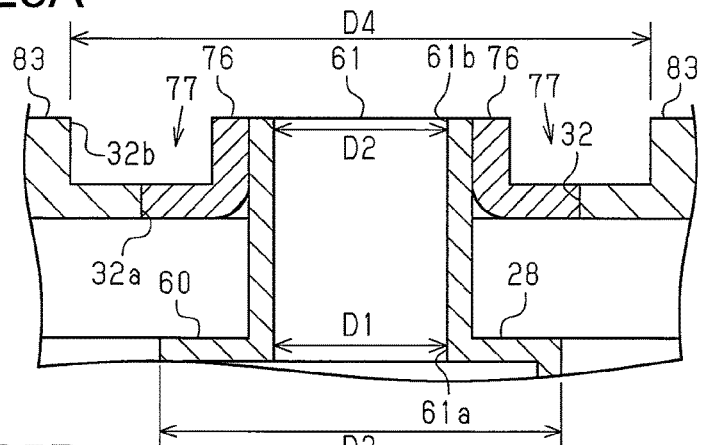
FIG. 25A is a schematic cross-sectional view of a modified example showing a configuration in which a seal member is arranged between an exterior member of the printing device and the liquid inlet of the liquid container.
Figure 25B:
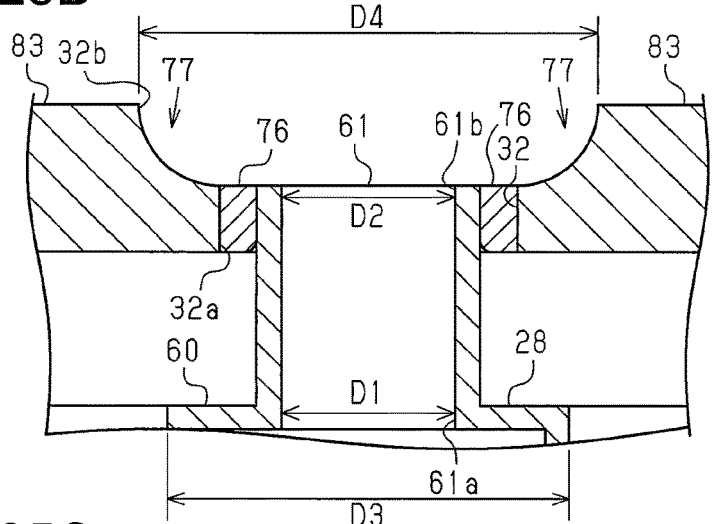
FIG. 25B is a schematic cross-sectional view of a further modified example showing a configuration in which a seal member is arranged between an exterior member of the printing device and the liquid inlet of the liquid container.
Figure 25C:
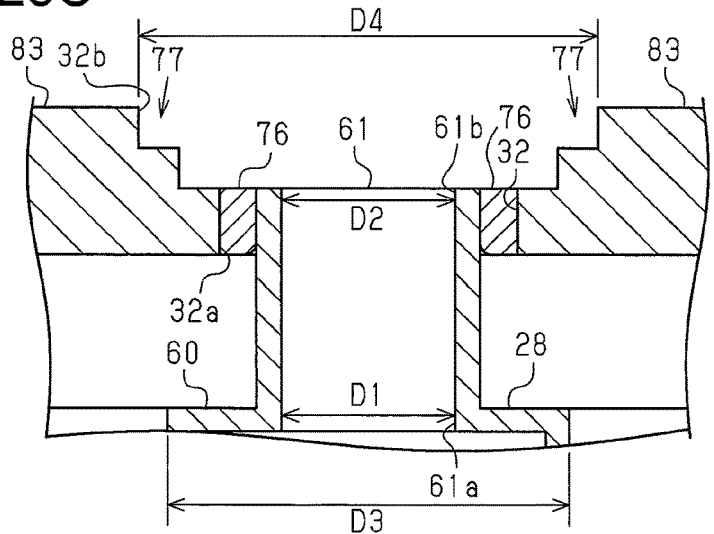
FIG. 25C is a schematic cross-sectional view of a further modified example showing a configuration in which a seal member is arranged between an exterior member of the printing device and the liquid inlet of the liquid container.

In the first embodiment and the modified example of FIG. 22A, the recess 77 in the seal member 76 may be formed by, for example, the cooperation of the liquid container housing 83, which is one example of an exterior member, and the seal member 76 as shown in FIGS. 25A, 25B, and 25C.

Figure 26A:
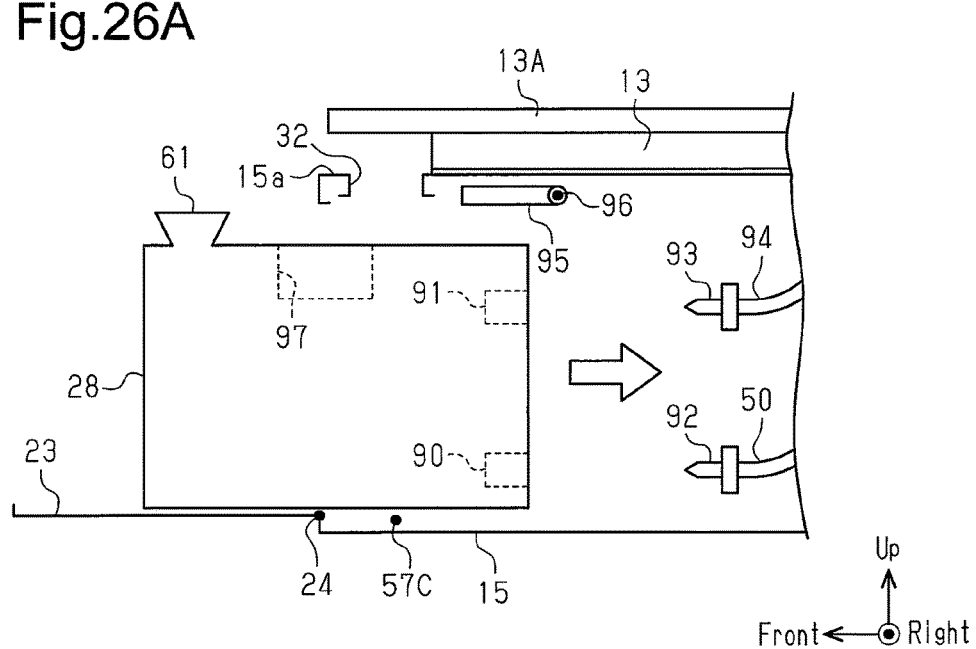
FIG. 26A is a schematic cross-sectional view showing another modified example of a liquid container attached to the shell of the printing device.
Figure 26B:
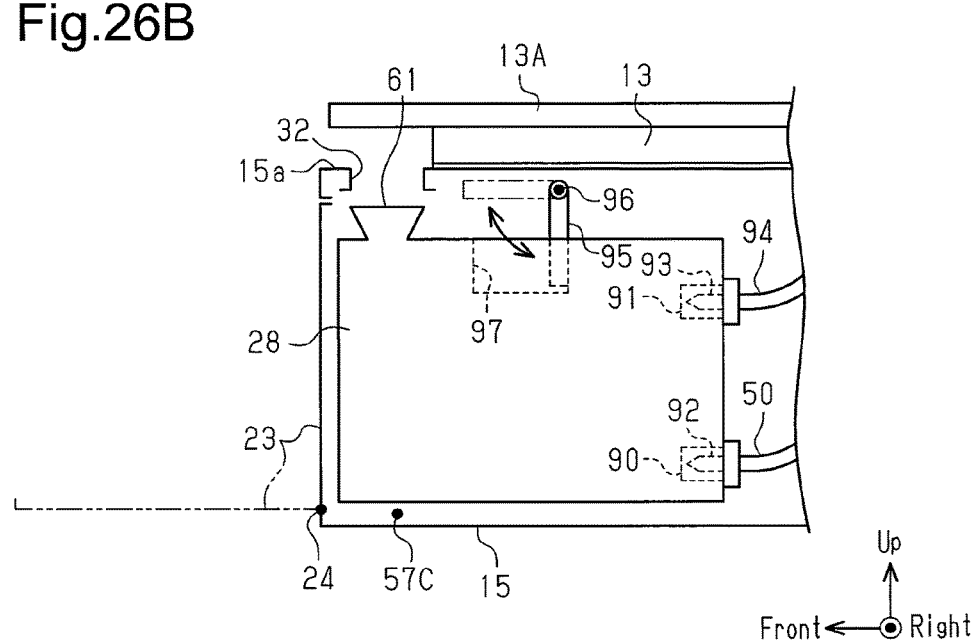
FIG. 26B is a diagram illustrating a state in which the liquid container shown in FIG. 26A is inserted into the shell shown in FIG. 26A.

As shown in FIGS. 26A and 26B, in the above embodiment, the rear surface of the liquid container 28 may include, for example, a liquid supply valve 90 and an atmosphere communication valve 91. In this case, a liquid supply needle 92, which is insertable into and removable from the liquid supply valve 90, and an atmosphere communication needle 93, which is insertable into and removable from the atmosphere communication valve 91, are arranged at the inner rear side (right side as viewed in FIGS. 26A and 26B) of a holding space 57C in the shell 15. The holding space 57C serves as a holding portion capable of holding the liquid containers 28 in a positioned state. The liquid supply tube 50 includes one end connected to the liquid ejection head 42 and another end connected to the liquid supply needle 92. An atmosphere communication tube 94 includes one end open to the atmosphere and another end connected to the atmosphere communication needle 93.

The liquid container 28 of the modified example shown in FIG. 26A is inserted into the holding space 57C from the front side of the shell 15 as indicated by the arrow with the lid 23 opening the front surface of the shell 15. Consequently, as shown in FIG. 26B, the liquid supply needle 92 is inserted into the liquid supply valve 90, and the atmosphere communication needle 93 is inserted into the atmosphere communication valve 91. This opens the valve members (not shown) in the valves 90 and 91. As a result, ink is supplied from the liquid container 28 through the liquid supply valve 90, the liquid supply needle 92, and the liquid supply tube 50 to the liquid ejection head 42. Further, the inside of the liquid container 28 is communicated with the atmosphere through the atmosphere communication valve 91, the atmosphere communication needle 93, and the atmosphere communication tube 94.

As shown in FIGS. 26A and 26B, a lever 95 is arranged in the upper portion of the holding space 57C inside the shell 15. The lever 95 is pivotal about a shaft 96 between a horizontal position (refer to FIG. 26A) and a vertical position (position shown by solid lines in FIG. 26B). The lever 95 is pivoted by, for example, operating an operation member (not shown). When the liquid container 28 is inserted into the holding space 57C and the needles 92 and 93 are inserted into the valves 90 and 91, the lever 95 is pivoted to the vertical position to engage a recessed portion 97 formed in the upper surface of the liquid container 28. The engagement of the lever 95 with the recessed portion 97 positions the liquid container 28 and restricts separation of the liquid container 28 from the holding space 57C.

In the above embodiments, the projections 70 and the vertical grooves 73 that form the aligning mechanism may be configured so that the projections 70 are arranged on the holding member 57, and the vertical grooves 73 are arranged in the liquid containers 28.

In the above embodiment, the aligning mechanism does not have to be formed by the projections 70 and the vertical grooves 73 and may be, for example, a combination of a male thread and a female thread or a printed identification mark.

In the second embodiment, the projection amount of the liquid supply unit 27 from the front surface of the shell 15 may be greater than or less than the projection amount of the paper ejection tray 20.

In the second embodiment in which the liquid container 28 partially projects out of the shell 15, the liquid inlet 61 may be located inside the shell 15. In this case, preferably, the corresponding open portion 32 is located above the liquid inlet 61. This also increases the volume of the ink that can be held.

The liquid container 28 does not have to include the flow restriction 60a and the upper limit portion 63a. Further, the visual checking portion 63 may include a lower limit portion (not shown) that indicates a near end of the ink amount. Further, the visual checking portion 63 may include, for example, an index or the like that indicates a halfway amount.

In each of the above embodiments, the printing device 12 may be a dot impact printer or a laser printer as long as printing can be performed on a medium. The printing device 12 may be of a sole configuration having only a printing function and not be included in an all-in-one machine. Further, the printing device 12 is not limited to a serial printer and may be a line printer or a page printer.

In each of the above embodiment, the printing device 12 uses four colors of ink but may use only a single color of ink, two or three colors of ink, or five or more colors of ink. The number of the liquid containing chambers 59, the liquid supply tubes 50, and the like need only be in correspondence with the number of colors that are used.

The liquid containers 28 may be formed independently for each color of ink. Alternatively, the liquid containers 28 for multiple colors (may be all of the colors) may be formed integrally.

The medium is not limited to paper P and may be a resin film, metal foil, metal film, a composite film (laminate film) of resin and metal, fabric, nonwoven fabric, ceramic sheet, or the like.

In the above embodiments, the printing device 12 may be a liquid ejection device that ejects or discharges a liquid other than ink. A fine amount of liquid ejected from the liquid ejection device as a liquid droplet may be in a state that is particulate, tear-like, or shaped in a tailed manner. The liquid referred to here may be any material that can be ejected from the liquid ejection device. For example, the liquid may be a substance that is in a liquid phase state. Thus, the liquid may be a fluidal body such as a liquid body having low or high viscosity, a sol, gel water, other inorganic solvents, an organic solvent, a liquid solution, a liquefied resin, or a liquefied metal (metal melt). Further, the liquid is just not one state of a substance and includes particles of a functional material formed by a solid such as pigments or metal particles that are dissolved, dispersed, or mixed. Representative examples of liquid ink, such as that described in the above embodiments, include liquid crystal and the like. Ink includes typical water-based ink and oil-based ink and various liquid compositions such as gel ink and hot melt ink.

The invention claimed is:

1. A printing device comprising:
a printing unit that performs printing on a medium using liquid;
a liquid container that includes a liquid containing chamber, which is capable of containing the liquid supplied to the printing unit, and a liquid inlet, which allows the liquid containing chamber to be filled with the liquid, wherein the liquid inlet projects above a top surface of the liquid container;
a shell that accommodates the printing unit and a portion of the liquid container, wherein the liquid container includes a projecting portion that projects out of the shell;
a protection member that covers the projecting portion, wherein the protection member projects out of the shell in a direction that is the same as a direction in which the liquid container projects out of the shell; and
a liquid supply unit that includes the liquid container, wherein
a lower portion of the shell includes a medium setting portion on which the medium is set,
the set medium is transferred from a front part of the shell toward the printing unit and ejected to the front part of the shell,
a front surface of the liquid container is located frontward from the medium setting portion,
the liquid container is shaped to have a rectangular parallelepiped form as a whole,
the liquid container is attached to the shell in a front surface attachment arrangement in which the liquid container projects out of a front surface of the shell and a longitudinal direction of the liquid container conforms to a rearward direction of the shell,
the shell includes a holding portion that is capable of holding the liquid supply unit in a positioned state, and
the printing device includes an aligning mechanism that aligns the liquid container and the holding portion when the liquid container is attached to the holding portion from the above.

2. The printing device according to claim 1, wherein the liquid inlet is included in the projecting portion.

3. The printing device according to claim 1, wherein the protection member includes an opening that exposes the liquid inlet at a position corresponding to the liquid inlet.

4. The printing device according to claim 1, wherein the liquid container is one of a plurality of liquid containers, and the liquid containers are formed integrally.

5. The printing device according to claim 1, further comprising an ejection portion on which the medium ejected from the printing unit is placed, wherein:
a frontward projection amount of the liquid container from the shell is less than or equal to a frontward projection amount of the ejection portion from the shell.

6. The printing device according to claim 1, wherein the holding portion is capable of holding the liquid supply unit in a fixed state.

7. The printing device according to claim 1, wherein the aligning mechanism includes:

a guide included in one of the liquid supply unit and the holding portion, wherein the guide extends in a direction in which the liquid supply unit is coupled to the holding portion; and
a sliding portion included in the other one of the liquid supply unit and the holding portion, wherein the sliding portion slides relative to the guide when the liquid supply unit is coupled to the holding portion.

8. The printing device according to claim 1, wherein
the liquid supply unit includes liquid containers that are laid out next to each other in one direction, and
the aligning mechanism is located at one side and another side of the liquid supply unit with respect to a direction in which the liquid containers are laid out.

9. The printing device according to claim 1, wherein the liquid inlet is located frontward from the medium setting portion.

10. The printing device according to claim 1, wherein an upper portion of the shell includes a reading device configured to read a document, and the liquid inlet is located frontward from a front surface of the reading device.

11. The printing device according to claim 1, wherein an upper portion of the shell includes a reading device configured to read a document, wherein a front surface of the liquid container is located frontward from a front surface of the reading device.

12. The printing device according to claim 1, comprising:
a liquid supply tube; and
a connection adapter that connects the liquid container and the liquid supply tube, wherein a flow passage of the liquid is formed inside the connection adapter.

13. The printing device according to claim 12, comprising a liquid supply unit that includes the plurality of liquid containers, wherein the liquid supply unit includes the connection adapter, and the flow passage of the connection adapter is one of a plurality of flow passages respectively corresponding to the plurality of liquid containers.

14. The printing device according to claim 1, comprising a cover that covers an opening of the protection member.

15. The printing device according to claim 14, further comprising a liquid absorbent arranged in a lower portion of the cover, wherein the liquid absorbent is capable of absorbing and holding the liquid.

16. A printing device comprising:
a printing unit that performs printing on a medium using liquid;
a liquid container that includes a liquid containing chamber, which is capable of containing the liquid supplied to the printing unit, and a liquid inlet, which allows the liquid containing chamber to be filled with the liquid, wherein the liquid inlet projects above a top surface of the liquid container;
a shell that accommodates the printing unit and a portion of the liquid container, wherein the liquid container includes a projecting portion that projects out of the shell; and
a protection member that covers the projecting portion, wherein the protection member projects out of the shell in a direction that is the same as a direction in which the liquid container projects out of the shell, wherein
a lower portion of the shell includes a medium setting portion on which the medium is set,
the set medium is transferred from a front part of the shell toward the printing unit and ejected to the front part of the shell, and a front surface of the liquid container is located frontward from the medium setting portion.

\* \* \* \* \*